US012358766B2

(12) United States Patent
Deuerling et al.

(10) Patent No.: US 12,358,766 B2
(45) **Date of Patent: *Jul. 15, 2025**

(54) LOAD-SENSING VEHICLE LIFT

(71) Applicant: Vehicle Service Group, LLC, Madison, IN (US)

(72) Inventors: Austin Deuerling, Madison, IN (US); Doug Spiller, Madison, IN (US); Ron Schneider, Addyston, OH (US); John Uhl, Madison, IN (US); Gerry Lauderbaugh, Madison, IN (US); Robert Elliott, Madison, IN (US); Darian Smith, Madison, IN (US); Doug Brown, Madison, IN (US); Jason Stewart, Harvest, AL (US)

(73) Assignee: Vehicle Service Group, LLC, Madison, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,786

(22) Filed: Dec. 30, 2024

(65) Prior Publication Data

US 2025/0128922 A1 Apr. 24, 2025

Related U.S. Application Data

(63) Continuation of application No. 17/614,308, filed as application No. PCT/US2020/034847 on May 28, 2020, now Pat. No. 12,195,313.

(Continued)

(51) Int. Cl.

*B66F 7/00* (2006.01)
*B66F 3/25* (2006.01)

(Continued)

(52) U.S. Cl.

CPC .................. *B66F 3/25* (2013.01); *B66F 7/16* (2013.01); *F15B 15/20* (2013.01); *B66F 7/14* (2013.01); *B66F 17/00* (2013.01); *E04H 6/06* (2013.01)

(58) Field of Classification Search

CPC ................. B66F 7/00; B66F 7/16; B66F 7/28

See application file for complete search history.

(56) References Cited

U.S. PATENT DOCUMENTS 4,278,411 A 7/1981 Anderson
4,548,296 A 10/1985 Hasegawa (Continued)

FOREIGN PATENT DOCUMENTS

CN 107140589 A 5/2002
CN 103671310 A 3/2014

(Continued)

OTHER PUBLICATIONS

Chinese Office Action and Search Report dated Mar. 4, 2023, for Application No. 202080039649.8, 12 pages.

(Continued)

*Primary Examiner* — Lee D Wilson

(74) *Attorney, Agent, or Firm* — Frost Brown Todd LLP

(57) ABSTRACT

Conventional vehicle lifts typically operate at a standard speed that is statically configured for the system, which may result in vehicles that are below the weight rating for the lift being raised at the standard speed while the lift motor is capable of safely raising at greater speeds. A set of lift controls may be configured to determine the load on the motor by a vehicle of an unknown weight during operation at a standard lift speed and use such information to determine a potential speed that the motor may raise the vehicle at while staying within safe operational levels for the motor. One or more of a magnitude of electrical power drawn, a (Continued)

pressure generated by a hydraulic lifting, or a sensed vehicle weight may be used to provide an indication of load on the motor and/or a higher potential speed.

14 Claims, 11 Drawing Sheets

Related U.S. Application Data

(60) Provisional application No. 62/853,240, filed on May 28, 2019.

(51) Int. Cl.

| | |
|---|---|
| ***B66F 7/16*** | (2006.01) |
| ***F15B 15/20*** | (2006.01) |
| *B66F 7/14* | (2006.01) |
| *B66F 17/00* | (2006.01) |
| *E04H 6/06* | (2006.01) |

(56) References Cited

U.S. PATENT DOCUMENTS

| | | | | |
|---|---|---|---|---|
| 8,083,034 | B2 | 12/2011 | Bordwell et al. | |
| 11,305,972 | B1 | 4/2022 | Elliot et al. | |
| 11,731,867 | B2 | 8/2023 | Smith et al. | |
| 12,195,313 | B2 | 1/2025 | Deuerling et al. | |
| 2001/0030085 | A1 | 10/2001 | Nagata et al. | |
| 2002/0009962 | A1 | 1/2002 | Swaddle et al. | |
| 2003/0056508 | A1 | 3/2003 | Fan | |
| 2004/0124391 | A1 | 7/2004 | Takekata et al. | |
| 2004/0149520 | A1 | 8/2004 | Taylor et al. | |
| 2005/0182522 | A1 | 8/2005 | Chase | |
| 2006/0191405 | A1 | 8/2006 | Itose | |
| 2008/0128214 | A1 | 6/2008 | Tahashi et al. | |
| 2009/0077737 | A1* | 3/2009 | Dyhr | A61G 7/1015 5/85.1 |
| 2015/0307334 | A1* | 10/2015 | Van Houten | B66F 3/46 254/89 R |
| 2016/0002017 | A1 | 1/2016 | Ueda et al. | |
| 2018/0186610 | A1 | 7/2018 | De Jong | |
| 2018/0194601 | A1* | 7/2018 | Van Houten | B66F 3/46 |
| 2018/0354760 | A1 | 12/2018 | Elliott et al. | |
| 2020/0377354 | A1 | 12/2020 | Smith et al. | |
| 2021/0122619 | A1* | 4/2021 | De Jong | B66F 7/20 |
| 2021/0309499 | A1* | 10/2021 | Elliott | B66F 3/25 |
| 2022/0259026 | A1* | 8/2022 | Deuerling | F15B 15/20 |
| 2022/0356051 | A1* | 11/2022 | Elliott | B66F 9/04 |

FOREIGN PATENT DOCUMENTS

| | | | |
|---|---|---|---|
| DE | 3629089 | A1 | 3/1988 |
| JP | H06-42893 | U | 6/1994 |
| JP | H07-163190 | A | 6/1995 |
| JP | H07-196292 | A | 8/1995 |
| JP | H07-269143 | A | 10/1995 |
| JP | 2001-275434 | A | 10/2001 |
| JP | 2005-225594 | A | 8/2005 |
| WO | WO 2002/034665 | A2 | 5/2002 |
| WO | WO 2012/165236 | A1 | 12/2012 |

OTHER PUBLICATIONS

Chinese Office Action dated Dec. 6, 2023, for Application No. 202080039649.8, 12 pages.

Chinese Office Action and Search Report dated Apr. 27, 2024, for Application No. 202080039649.8, 14 pages.

International Search Report and Written Opinion dated Jan. 29, 2021, for International Application No. PCT/US2020/034847, 20 pages.

* cited by examiner

LOAD-SENSING VEHICLE LIFT

REFERENCE TO RELATED APPLICATIONS

This application is a continuation of and claims priority to U.S. Non-Provisional patent application Ser. No. 17/614,308, entitled "Load-Sensing Vehicle Lift," filed on Nov. 24, 2021, which claims the benefit of PCT/US2020/034847, entitled "Load-Sensing Vehicle Lift," filed on May 28, 2020, and U.S. Provisional Pat. App. No. 62/853,240, entitled "Load-Sensing Vehicle Lift," filed on May 28, 2019, the disclosures of each of which are incorporated by reference herein.

FIELD

The disclosed technology pertains to a system for automatically controlling speed of a vehicle lift.

BACKGROUND

Vehicle lifts have varying designs and capabilities, including drive-on or in-ground lifts that lift a parked vehicle by raising the parking surface in order to allow access to the underside of the vehicle, as well as frame-engaging lifts that raise a vehicle by contacting structural lifting points on the underside frame of the vehicle, which allow access to the underside of the vehicle and allow wheels and tires to be removed or serviced.

Lifting vehicles during service can be a time-consuming and labor-intensive process. Technicians must properly position a vehicle relative to the lift and ensure that the lift arms or other lift structure is properly engaging the vehicles lift points prior to lifting the vehicle, which can take several minutes. The time required to lift a vehicle may depend on the particular type of vehicle lift being used and its capabilities and may typically reach 1-2 minutes depending upon the desired lift height. During lifting, a technician must continuously observe the lift and may also be required to continuously engage a switch, lever, or other lift control.

A technician in a high-volume service environment may lift thirty or more vehicles per day, meaning that a single technician may spend upwards of an hour during the day activating a button or lever and observing a lift in motion. In a service environment with ten vehicle lifts, this may amount to ten or more hours of labor per day. As can be seen, increasing the speed at which a lift can raise a vehicle can provide significant savings of time for a service environment. For example, even a 20% increase in lifting speed may reduce labor costs in a ten-lift operation by about two hours per day, or more than 700 hours per year.

What is needed, therefore, is an improved lift that allows for variable lift speed.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of vehicle lifts. While the disclosed applications of the inventors' technology satisfy a long-felt but unmet need in the art of automatic vehicle lifts, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only and should not be treated as limiting.

Figure 1:
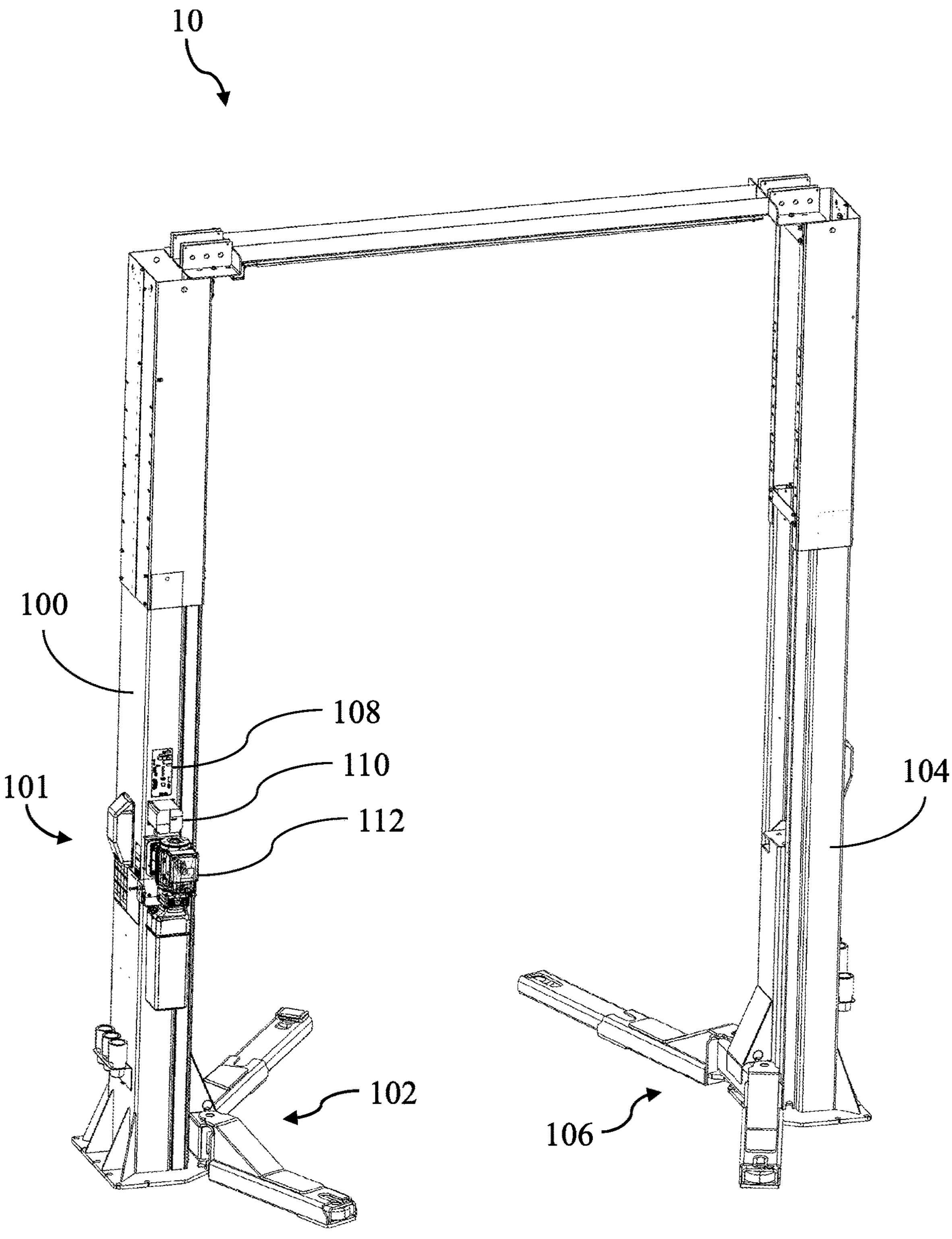
FIG. 1 is a perspective view of an exemplary lift.

Turning now to the figures, FIG. 1 shows an exemplary lift (10) that can be used to raise a vehicle and allow access to the underside of the vehicle for a variety of maintenance tasks. The lift (10) includes a pair of lift posts (100, 104), each lift post having a lift structure (102, 106). A set of control components (101) of the lift (10), shown in a magnified view in FIG. 2, includes a lift controller (108), a variable frequency drive (110), and a motor (112). Some implementations of the set of control components (101) may not include each component shown in FIG. 2, and may also include additional components, as will be described in more detail below. The lift (10) may be connected to a power supply (not pictured) to provide power to the electrical components of the lift. An appropriate power supply may vary depending upon the particular implementation of the lift (10), but may include power supplies such as a single-phase, 220-volt AC 20-amp service, a service with 3-phase voltage, a service with DC voltage, or other services that may be configured to provide appropriate voltage, currency, and frequency, as may be available in a particular service environment, country, or other application.

The lift controller (108) may be one or more of a computer, circuit board, microcontroller, programable logic controller, mobile device, smart phone, tablet device, proprietary device, or other device having one or more capabilities such as sending, receiving, analyzing, storing, and modifying data, executing programming or other logic instructions, and providing control signals or other control instructions to coupled devices. The variable frequency drive (110) may receive power from an attached power supply and may, based upon its own logic controller, based upon instructions from the lift controller (108), or based upon both, may condition (e.g., by varying one or more of frequency, current, and voltage) and provide power to the motor (112) in order to control the operation of the motor (112).

The motor (112) may be operated based upon one or more of its own logic controller, the lift controller (108), or the variable frequency drive (110), in order to raise and lower the lift structures (102, 106). The motor (112) may be, for example, a 3-phase motor, a single-phase motor, a DC voltage motor, or other type of motor as may be appropriate for a particular lift, service environment, country, or other application. The motor (112) may raise and lower the lift structures (102, 106) by producing mechanical energy that is translated to a lifting motion of the lift structures (102, 106) through a mechanical linkage, hydraulic system, or other system as will be apparent to one of ordinary skill in the art in light of this disclosure.

Figure 2:
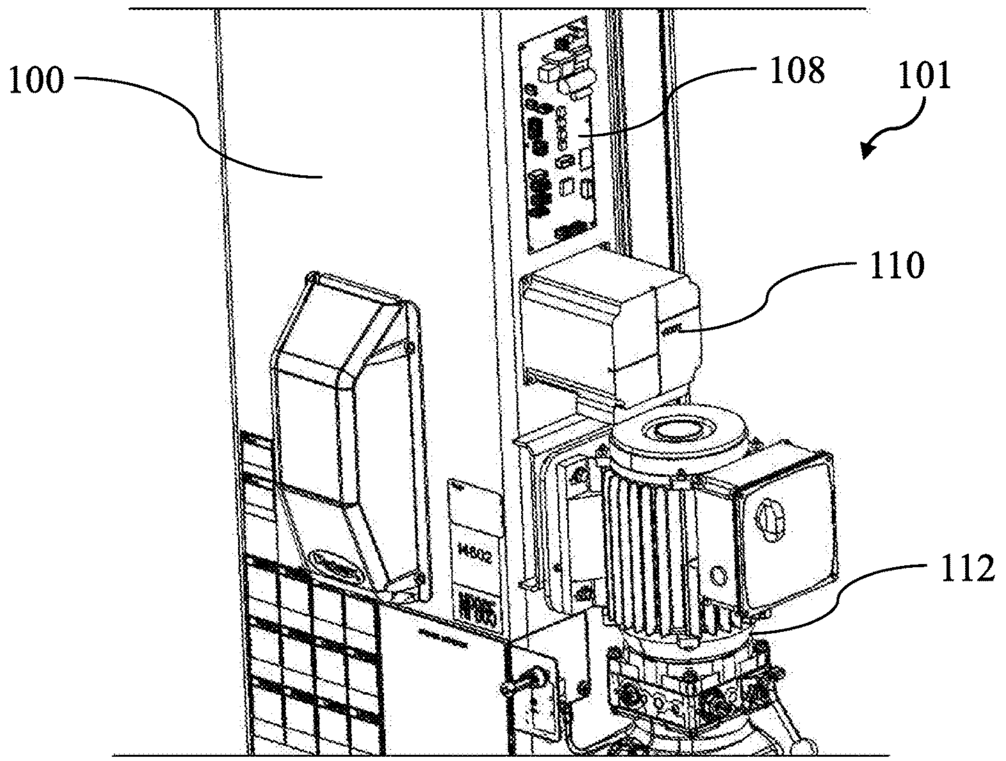
FIG. 2 is a perspective view of a set of control components of the lift of FIG. 1.

While the lift (10) shown in FIGS. 1 and 2 is usable with the technology disclosed herein, it should be understood that various other types of lifts are also usable, including, for example, four-post lifts, in-ground lifts, scissor lifts, portable lifts, and other types of frame-engaging and wheel-engaging lifts having an electrically driven lift feature such as the motor (112). In some implementations, the motor (112) will be operable at varying levels of torque and power depending upon the characteristics of electrical input received from the power supply. Conventionally, electrically driven lift systems are designed and rated around a maximum weight capacity, and as such the speed of a motor driving such a conventional system will typically be selected and configured based upon the maximum weight capacity.

As an example, a lift system rated to lift a ten-thousand-pound vehicle will have a motor that is configured to raise the lift at a static speed that such a system's motor is capable of for a 10,000-pound vehicle, without exceeding the motor's ability to safely receive electrical energy and transform it into mechanical energy, which might cause the motor to overheat or otherwise be damaged or may simply exceed the motor's maximum torque. While operating at this static speed is appropriate for a 10,000-pound vehicle, it may result in unnecessarily slow lifting speeds for vehicles weighing less than 10,000 pounds. For example, if the same lift is used to raise a 5000-pound vehicle, the motor may provide the same static raising speed, while being capable of speeds approximately twice as fast. With many common passenger vehicles being between 2500 and 3500 pounds, it can be seen that highly rated lifts may be producing unnecessarily slow lift speeds for many of the vehicles they are used with.

Figure 3:
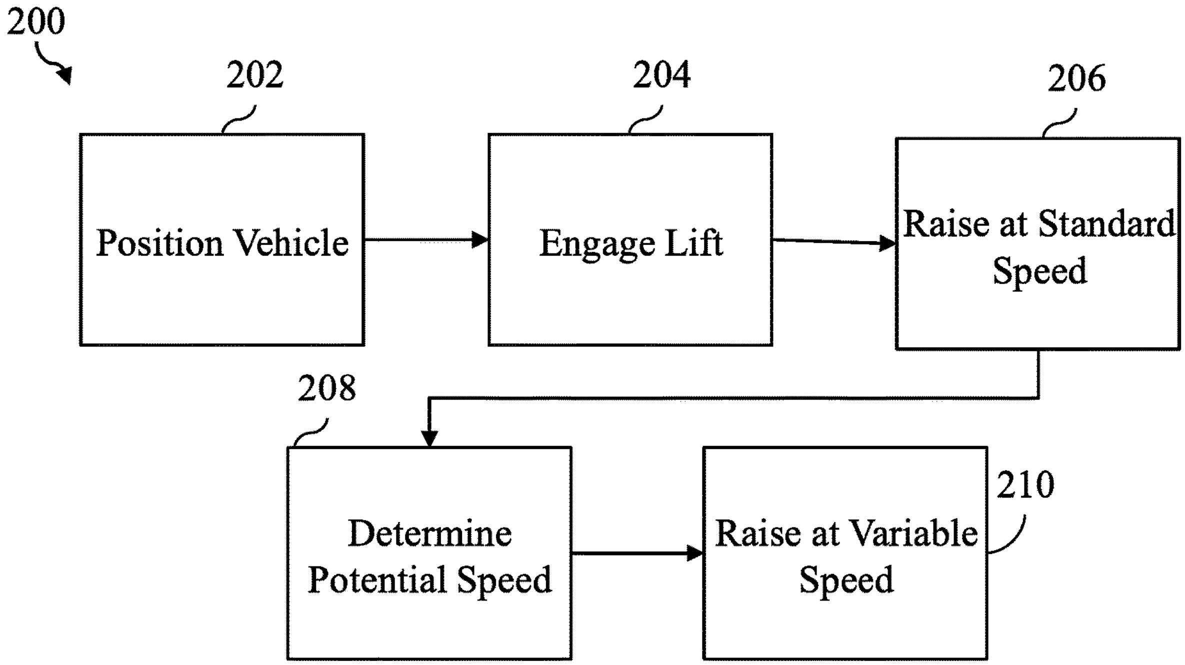
FIG. 3 is a flowchart of an exemplary set of steps that may be performed with the lift of FIG. 1 in order to control the lift with variable lift speed.

To improve upon conventional limitations, the lift (10) of FIG. 1 includes a control system that is capable of reactively optimizing lift speed by adjusting between constant torque and constant horsepower based on the weight of a particular vehicle, based upon a user control, or both. For example, FIG. 3 shows a flowchart of an exemplary set of steps (200) that may be performed with a lift such as the lift (10) of FIG. 1 in order to control a lift at a variable, optimized lift speed. One or more of the steps may be performed by or with the lift controller (108), the variable frequency drive (110), the motor (112), or other components, and in some implementations may be performed by one or more such components configured as a speed controller. The steps (200) include positioning (202) a vehicle appropriately relative to the lift (10), which may include a technician piloting a vehicle into a position where the lift structures (102, 106) can reach the vehicle lifting points. The lift (10) may then engage (204) the vehicle lift points, which may include a manual or automated rotation, extension, or elevation of one or more portions of the lift structures (102, 106) until they contact or nearly contact the vehicle lift points. The lift (10) may then be operated (e.g., manually by a user interacting with a switch, lever, pendant, wireless controller, or other device in communication with the set of control components (101), or automatically by a lift automation system in communication with the set of control components (101)) to cause the lift structures (102, 106) to raise (206) at a standard or default speed so that the vehicle is lifted from the floor and the full weight of the vehicle is borne by the lift structures (102, 106).

When the vehicle is fully supported by the lift structures (102, 106), one or more components (e.g., the lift controller (108), the variable frequency drive (110)) of the set of control components (101) may determine (208) the potential rising speed based upon feedback to the set of control components (101) produced during lifting of the full weight of the vehicle. This may include, for example, a load signal, load information, or a load measurement (referred to herein as a "load") indicating an amount of current or power drawn from the power supply while raising (206) the vehicle (initially at the standard speed), a measured weight of the vehicle supported by the lift structures (102, 106), the pressure produced by a hydraulic system raising the vehicle, or other information associated with the load of the vehicle on the lift structures (102, 106), one or more of which may be used to determine the maximum potential speed the motor may operate at without stalling or damaging itself. With the potential raising speed determined (208), the set of lift components (101) may then begin to raise (210) the lift structures (102, 106) at a variable speed, such as the determined (208) potential rising speed or a lesser configured maximum speed (e.g., to prevent movement of the lift at unsafe speeds when there is no load or a very light load).

Figure 4A:
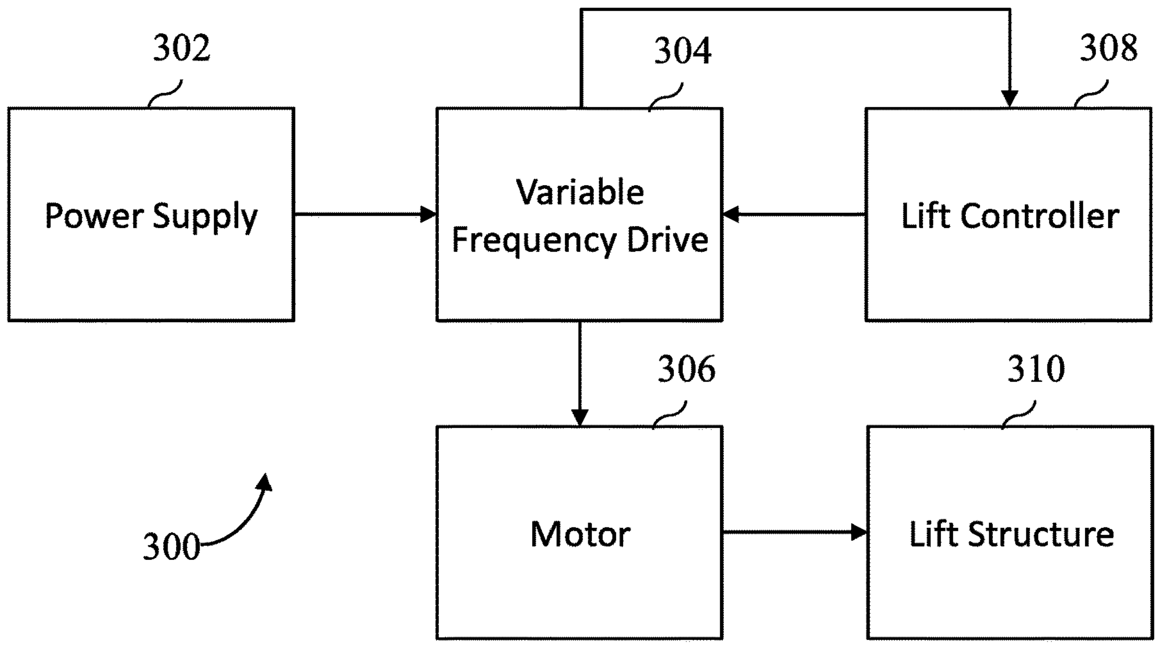
FIG. 4A is a schematic diagram of an exemplary arrangement of control components usable to vary lift speed using a variable frequency drive.

The set of control components (101) may be configured and arranged in various ways in order to determine (208) the potential raising speed when the vehicle load is supported by the lift structures (102, 106). For example, FIG. 4A shows a schematic diagram of an exemplary arrangement of control components (300) usable to vary lift speed. A power source (302) may have substantially similar features as the power source described above in relation to FIG. 1 and may be configured to provide electrical power to the control components (300). A variable frequency drive (304), having substantially similar features as the variable frequency drive (110), may receive electrical power from the power supply (302) and, based upon input from a lift controller (308), operate a motor (306). The lift controller (308) may have substantially similar features to the lift controller (108), while the motor (306) may have substantially similar features to the motor (112). Operation of the motor (306) may cause a lift structure (310) to be raised. The lift structure (310) may be, for example, the lift arms of a two-post lift, such as the lift structures (102, 106), a wheel-engaging structure of various types of lift, a frame-engaging structure of various types of lift, or other suitable structural lifting mechanism.

During operation of the motor (306) (e.g., as a result of a manual input via a button, lever, or other user device, or as a result of an automated movement), the lift controller (308) will transmit a control signal (e.g., a speed command in hertz) to the variable frequency drive (304) indicating operational characteristics (e.g., torque, power, rotational speed) at which the motor (306) should operate in order to raise the lift structure (310) at the desired rate of speed, which may be, for example, a standard or default speed for the lift such as the weight-rated speed. In response to the signal, the variable frequency drive (304) will draw electrical power from the power supply (302), condition the electrical power for use by the motor (306) to produce the desired raise speed, and provide the electrical power to the motor (306).

The magnitude of electrical power (e.g., in amperes) drawn by the variable frequency device (304) will depend upon the amount of power required to raise the lift structure (310) and any load thereon, which, in normal circumstances (e.g., excluding hardware malfunctions, poor maintenance, high heat, and other exceptional factors as will occur to those skilled in the art) will substantially depend upon the weight of the vehicle or other load being raised. The variable frequency drive (304) may determine the magnitude of electrical power drawn and provide such information via a feedback signal to the lift controller (308), which may adjust the control signal (e.g., a speed command in hertz) being provided to the variable frequency drive (304) in order to increase the amount of electrical power drawn, resulting in an increase in raise speed.

In effect, the control components (300) determine (208) the potential speed by using a feedback loop between the lift controller (308) and the variable frequency drive (304), where the maximum raising speed of the lift structure (310) is determined for a particular vehicle or load based upon drawn electrical power, and then lift the vehicle at (or closer to) that speed. This feedback loop may determine and increase the speed with a single cycle (e.g., the maximum speed may be determined and adjusted to directly from the standard speed) or in multiple cycles (e.g., the speed may be adjusted incrementally over several cycles until a maximum speed, goal speed, or other configured speed is reached).

Figure 4B:
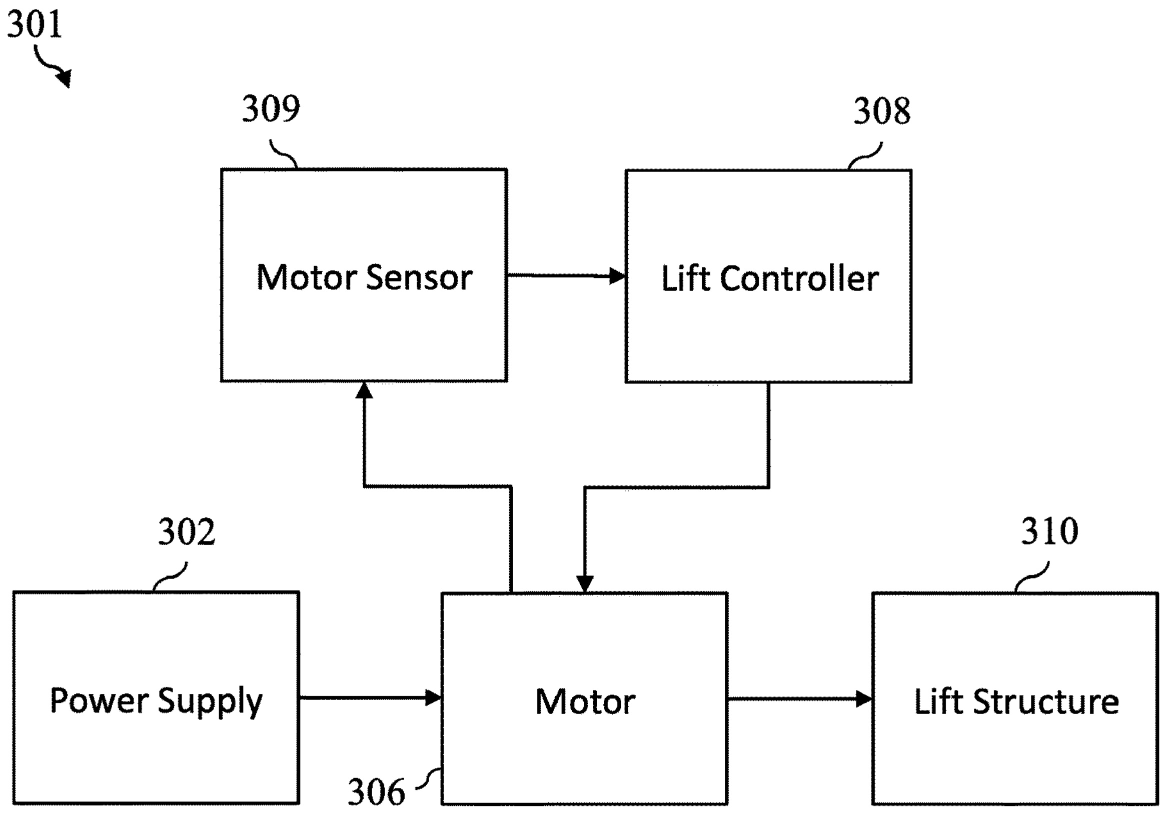
FIG. 4B is a schematic diagram of an alternative exemplary arrangement of control components usable to vary lift speed using pulse width modulation.

Other variations exist on the arrangement, configuration, and capabilities of control components that will be suitable for determining (208) the potential speed. As an example, FIG. 4B shows a schematic diagram of an alternative exemplary arrangement of control components (301) usable to vary lift speed. The control components (301) of FIG. 4B share several features with the control components (300) of FIG. 4A, including the motor (306), the lift structure (310), the power supply (302), and the lift controller (308). The lift controller (308) may be configured to provide control signals to the motor (306) in order to cause the motor (306) to draw power from the power supply (302) and operate to raise or lower the lift structure (310). In order to provide variable lift performance (e.g., such as the variable speed (210)), the lift controller (308) may be configured to provide pulse width modulation (PWM) of the control signals transmitted to the motor (306) in order to vary and achieve a desired operating speed for the motor (306).

The control components (301) also include a motor sensor (309) that is coupled to the motor (306) and configured to determine one or more characteristics of the motor's (306) current operation. The motor sensor (309) could be implemented as, for example, one or more of a tachometer monitoring commutation of the motor (306) shaft or other movable component, a hall-effect sensor monitoring electrical outputs of the motor (306) indicative of performance, a back EMF sensor monitoring electrical outputs of the motor (306) indicative of performance, or other sensors configured to measure mechanical, electrical, or other characteristics of the motor (306). Output from the motor sensor (309) may be provided to the lift controller (308) and used (e.g., as part of a continuous or intermittent feedback loop) to produce PWM control signals that will cause the lift to raise at the desired speed (e.g., the variable speed (210)) based upon the determined (208) potential speed. As arranged in FIG. 4B, the control components (301) do not require the variable frequency drive (304), and so such an implementation may be used as an alternative to, or redundant addition to, the control components (300) of FIG. 4A.

Figure 5A:
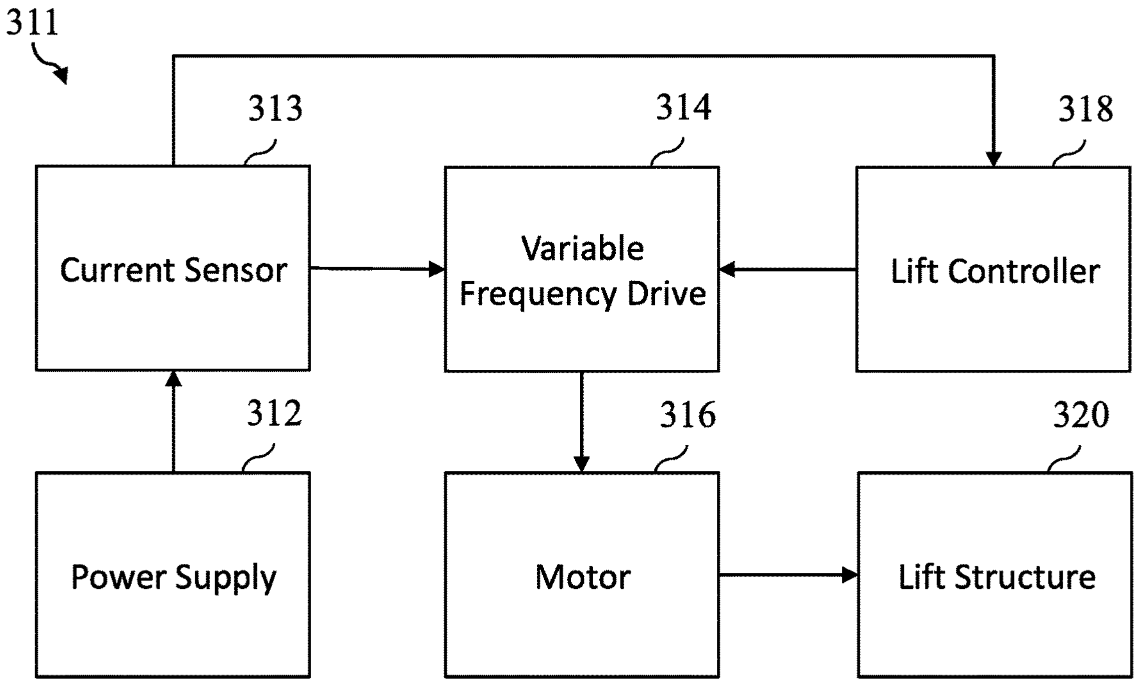
FIG. 5A is a schematic diagram of an alternative exemplary arrangement of control components, including an exemplary current sensor, usable to vary lift speed.

As another example of a variation, FIG. 5A shows a schematic diagram of an alternative exemplary arrangement of control components (311) usable to vary lift speed. The control components (311) include a current sensor (313) receiving electrical power from a power supply (312), which has substantially similar features to the power supply (302), a variable frequency drive (314), which has substantially similar features to the variable frequency drive (304), a motor (316), which has substantially similar features to the motor (306) and is operable to raise a lift structure (320), which has substantially similar features to the lift structure (310), and a lift controller (318), which has substantially similar features to the lift controller (308).

The control components (311) operate similarly to the control components (300) shown in FIG. 4A, except that the current sensor (313) is placed inline and detects the magnitude of the electrical current drawn from the power supply (312) by the variable frequency drive (314) and provides such information to the lift controller (318) in order to produce the variable speed feedback loop. In this manner, the lift controller (318) may, based upon one or more measurements of electrical current from the current sensor (313), determine (208) a potential raise speed, and provide signals to the variable frequency drive (314) to cause it to operate the motor (316) accordingly. While some conventional variable frequency drives are capable of detecting and reporting drawn electrical power (e.g., such as the variable frequency drive (304)), others are not. Several advantages provided by the control components (311) include enabling a feedback loop when the variable frequency drive (314) is incapable of reporting electrical power draw to the lift controller (318), providing redundant reporting of electrical power draw to improve upon accuracy or stability, providing more immediate reporting of electrical power draw to the lift controller (318) (e.g., as the current sensor (313) may be positioned and configured to provide information to the lift controller (318) more rapidly than the variable frequency drive (314)).

Figure 5B:
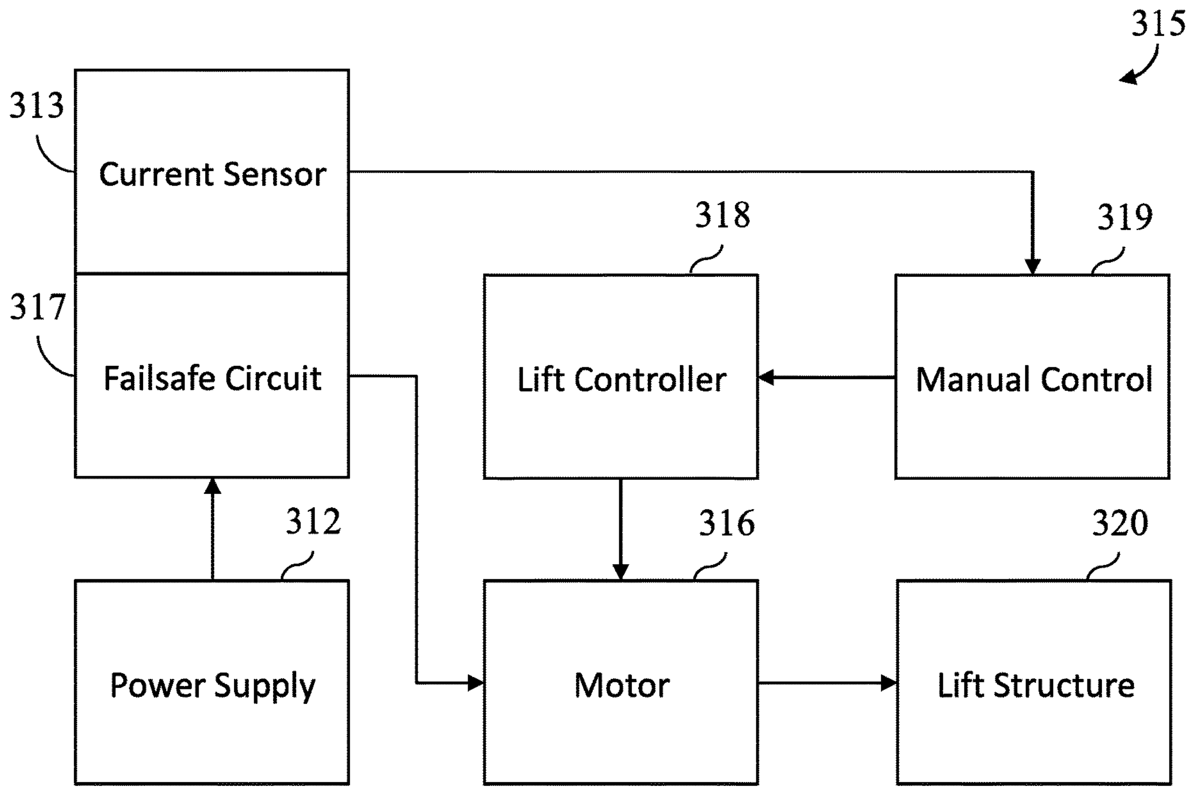
FIG. 5B is a schematic diagram of an alternative exemplary arrangement of control components, including a current sensor and user control, usable to vary lift speed.
Figure 12:
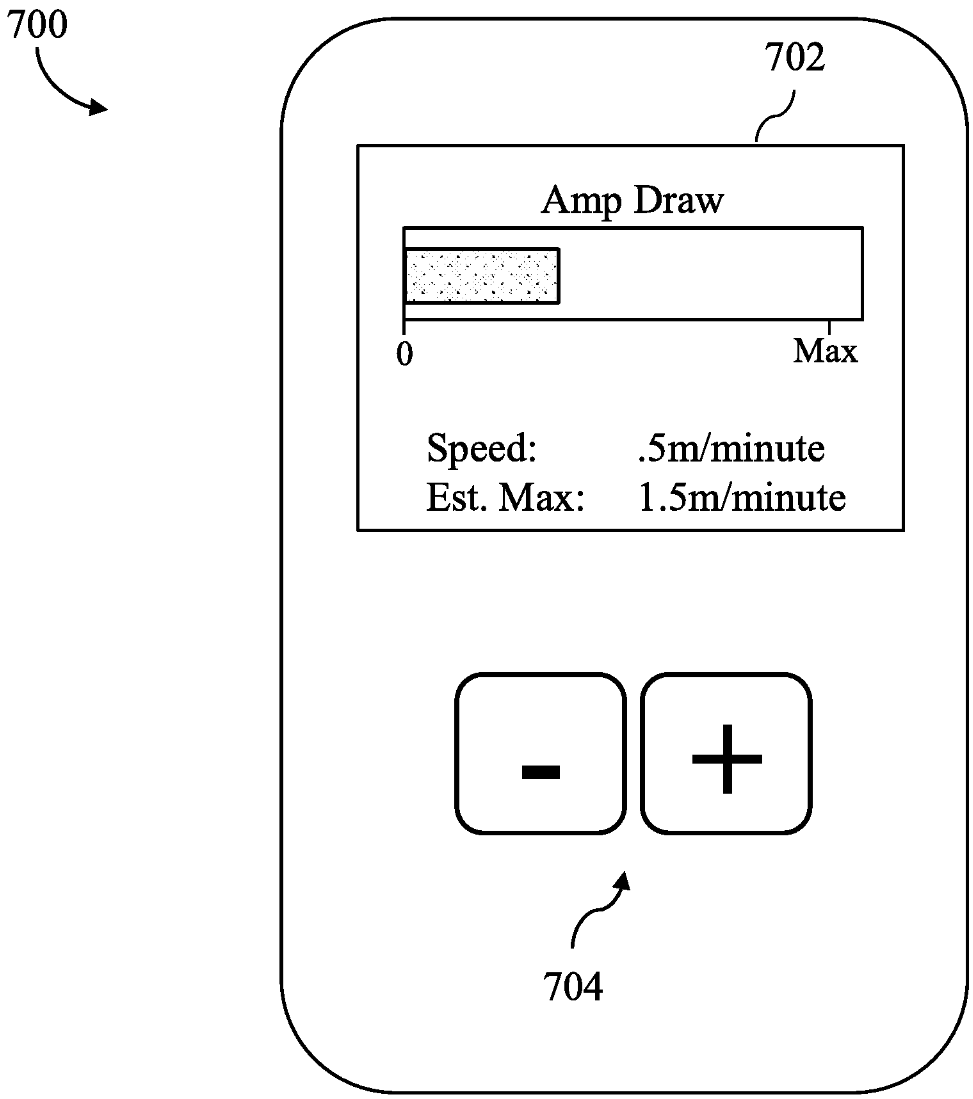
FIG. 12 is a schematic diagram of an exemplary manual control.

As another example of a variation on the control components, FIG. 5B shows a schematic diagram of an alternative exemplary arrangement of control components (315). The control components (301) of FIG. 4B share several features with the control components (311) of FIG. 5A, including the motor (316), the lift structure (320), the power supply (312), the lift controller (318), and the current sensor (313). The control components (315) are configured to allow for manual determination and control of the variable speed (210) via a manual control (319) that is in communication with the lift controller (318). A schematic diagram of an exemplary manual control (700) is shown in FIG. 12, which includes a display (702) and a speed control (704) illustrated as two buttons that may selectively increase or decrease, respectively, the speed of the lift. As can be seen, the display (702) shows a bar graph illustrating the current amp draw of the lift relative to the maximum amp draw. In some implementations, the display (702) may also show the lift's current speed (e.g., such as may be determined or estimated as described elsewhere herein) as well as a determined (208) maximum speed.

A user's interactions with manual control (319) (e.g., such as by the speed control (704)) will cause the manual control (319) to provide control signals to the lift controller (318). The lift controller (318) itself is configured to provide control signals to the motor (316) to cause the motor (316) to draw power from the power supply (312) and operate, and may be additionally configured to produce and provide those control signals based upon the control signals from the manual control (319). In this manner, a user may manually control the lift speed via the manual control (319) while observing the lift's speed, amp draw, or other detectable characteristics until a desired speed is reached. The control components (315) additionally include a failsafe circuit (317) that may be, for example, a fuse, thermal switch, or other circuit protector configured to prevent a dangerous amount of draw from the power supply (312). When a hazardous condition is detected, the failsafe circuit (317) may, for example, reduce the current lift speed or prevent further increase of the current lift speed, or may disable operation of the lift entirely. The manual control (319) and current sensor (313) may be in wireless or wired communication with each other, and they may be in direct communication or indirect communication (e.g., via the lift controller (318)), as will be apparent to those of ordinary skill in the art in light of this disclosure.

Figure 6:
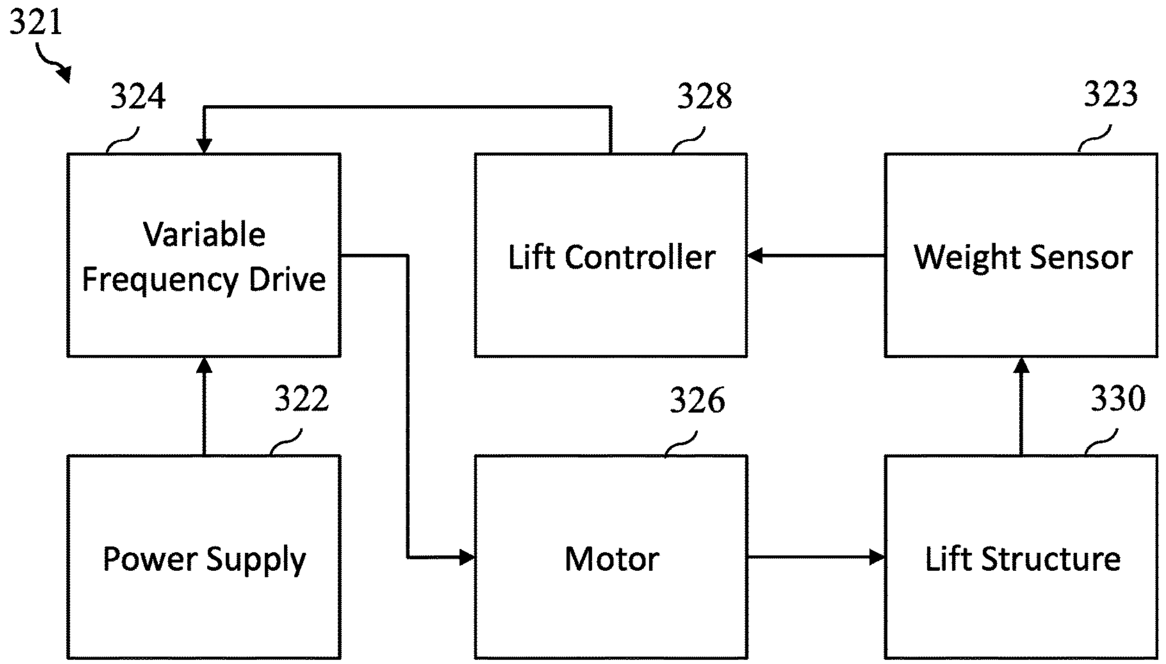
FIG. 6 is a schematic diagram of an alternative exemplary arrangement of control components, including an exemplary weight sensor, usable to vary lift speed.

As another example of a variation on the control components, FIG. 6 shows a schematic diagram of an alternative exemplary arrangement of control components (321) usable to vary lift speed. The variation shown in FIG. 6 includes a power supply (322), a variable frequency drive (324), a motor (326), a lift controller (328), and a lift structure (330), each having substantially similar features as the corresponding components describes in the context of FIG. 4A (e.g., the power supply (302), the variable frequency drive (304), the motor (306), the lift controller (308), and the lift structure (310)). Also shown in FIG. 6 is a weight sensor (323), which is connected to the lift structure (330) and configured to sense the weight of loads supported by the lift structure (330).

When the lift structure (330) supports a load while the lift is raised at a standard speed, the weight sensor (323) determines the weight of the load and provides a signal to the lift controller (328) indicating the weight of the load. The lift controller (328) may use the determined weight of the load to query against or compare to a database or dataset to determine (208) a potential speed for the lift raise operation. Table 1 shows an exemplary correlation table that the lift controller (328) may use to determine potential speed based upon information from the weight sensor (323), which may be usable for a lift with a maximum current draw of 20 amps and is configured to operate at a standard speed suitable for a 10,000-pound vehicle. The first column shows current draw for vehicles of various weights at a standard raising speed, the second column shows vehicle weight associated with that current draw, and the third column shows a max potential speed for a vehicle of that weight expressed as a percentage of the standard speed. It should be understood that the potential speed may be determined (208) in other ways than using a correlation table such as that shown in Table 1, and such variations will be apparent to one of ordinary skill in the art in light of the disclosure herein. A correlation table such as that shown in Table 1 may be built or configured manually at the time of lift manufacture or installation or may be built in real time using a lift with a control system having, for example, the current sensor (313) and the weight sensor (323), as will be described in more detail below.

TABLE 1

Exemplary Load Weight Correlation Table

| Standard Speed Draw (Amps) | Vehicle Weight (lbs) | Max Potential Speed |
|---|---|---|
| 5 | 2,500 | 400% |
| 10 | 5,000 | 200% |
| 15 | 7,500 | 133% |
| 20 | 10,000 | 100% |

Figure 7:
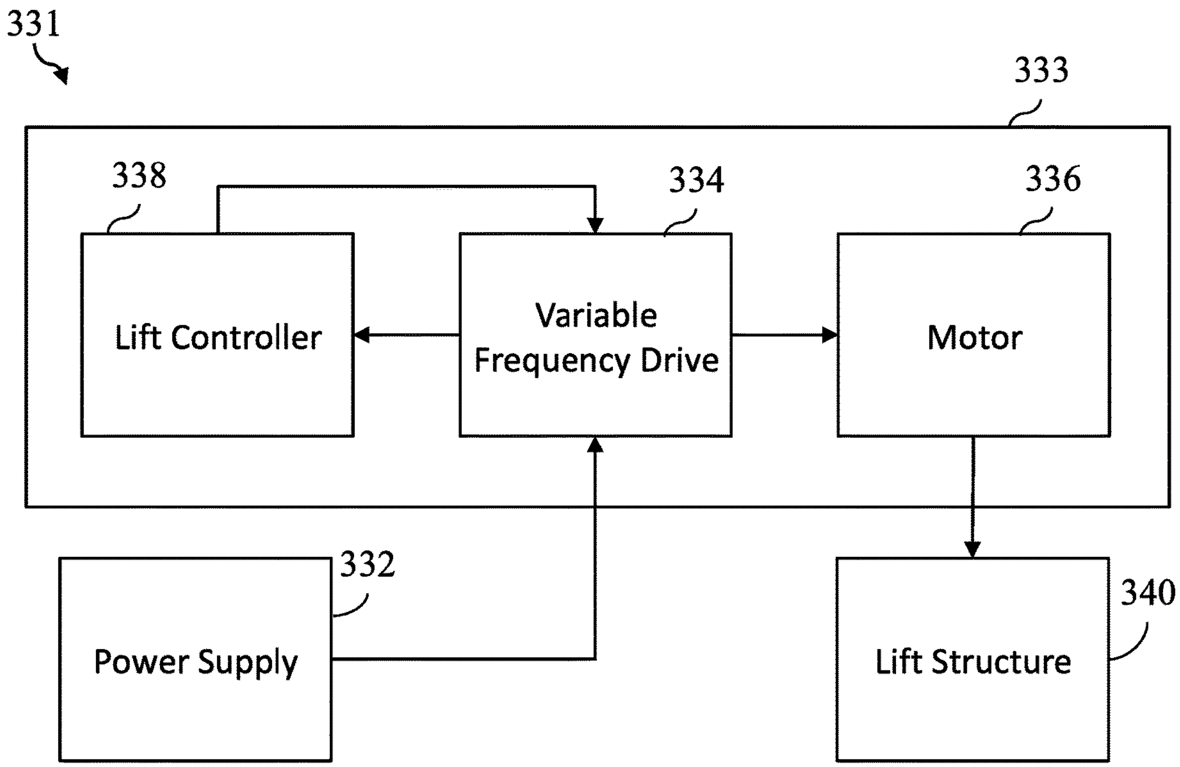
FIG. 7 is a schematic diagram of an alternative exemplary arrangement of control components, including an exemplary integrated power unit, usable to vary lift speed.

As yet another example, FIG. 7 shows a schematic diagram of an alternative exemplary arrangement of control components (331) usable to vary lift speed. The variation shown in FIG. 7 includes a power supply (332), a variable frequency drive (334), a motor (336), a lift controller (338), and a lift structure (340), each having substantially similar features as the corresponding components describes in the context of FIG. 4A (e.g., the power supply (302), the variable frequency drive (304), the motor (306), the lift controller (308), and the lift structure (310)). Also shown in FIG. 7 is an integrated power unit (IPU) (333), which may be a single case or component that includes related components such as the lift controller (338), the variable frequency drive (334), and the motor (336). Determining (208) potential speed using the integrated power unit (333) may function similarly to FIGS. 4A through 5B, in that a determined magnitude of electrical power draw may be used with a feedback loop in order to determine and adjust to a potential speed. An advantage of the integrated power unit (333) may include the ability to couple and position the lift controller (338) and variable frequency drive (334) in a fashion that shortens the distance traveled by signals traveling through communication paths therebetween, and improves the speed and efficiency at which the feedback loop signals are transmitted between the lift controller (338) and the variable frequency drive (334). Another advantage of the integrated power unit (333) may be the case of retrofitting a preexisting lift to allow for variable raising speeds, such as where the case of the integrated power unit (333) is adapted to be coupled to a motor mount on a lift structure (350).

Figure 8A:
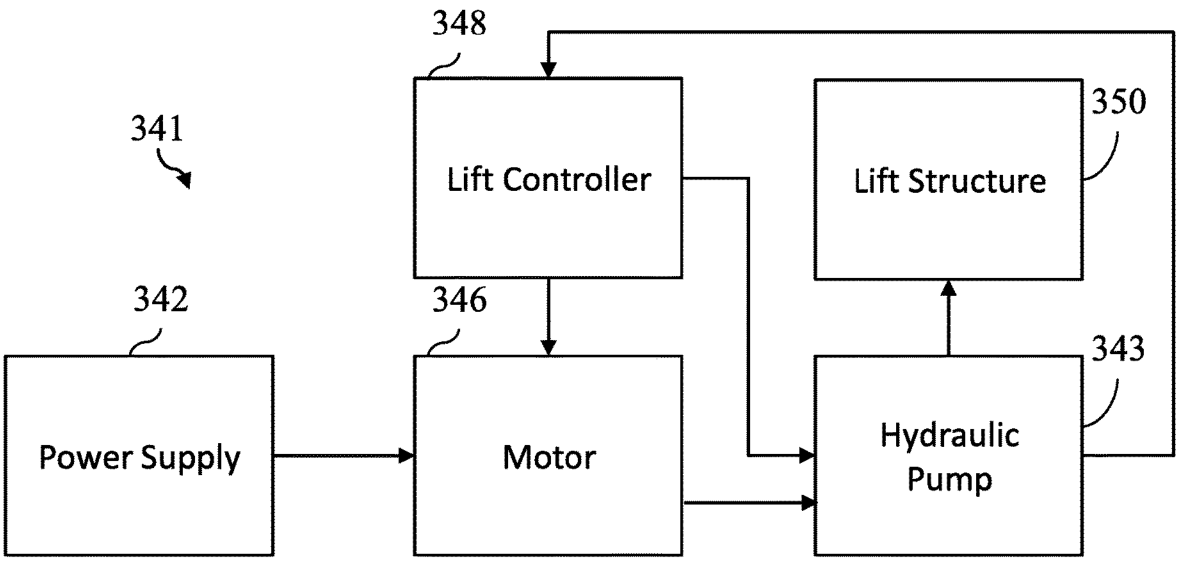
FIG. 8A is a schematic diagram of an alternative exemplary arrangement of control components, including an exemplary hydraulic pump, usable to vary lift speed.

As another example of a set of control components, FIG. 8A shows a schematic diagram of an alternative exemplary arrangement of control components (341) usable to vary lift speed. The variation shown in FIG. 8A includes a power supply (342), a motor (346), a lift controller (348), and a lift structure (350), each having substantially similar features as the corresponding components described in the context of FIG. 4A (e.g., the power supply (302), the motor (306), the lift controller (308), and the lift structure (310)). Also included is a hydraulic pump (343) that is operable by one or more of the motor (346) and the lift controller (348) to raise the lift structure (350). The hydraulic pump (343) may be, for example, a variable displacement hydraulic pump that is powered by the motor (346) and operates at varying flowrates in order to vary lift speed based upon a signal from the lift controller (348).

When the hydraulic pump (343) operates at a standard raise speed, a pressure sensor of the hydraulic pump (343) may sense a level of hydraulic pressure within the system that is correlated with the weight of the load being carried by the lift structure (350). As with the examples of FIG. 6, information that is indicative of a weight of the load carried by the lift structure (350) may be used to determine (208) a potential raise speed by querying or comparing against a database or dataset of values. Table 2 below shows an example of a pressure correlation table that may be used to determine (208) a potential raise speed. The first column shows a percentage of maximum operational pressure sensed by the hydraulic pump (343) for vehicles of various weights at a standard raising speed, the second column shows vehicle weight associated with that pressure, and the third column shows a maximum potential speed for a vehicle of that weight expressed as a percentage of the standard speed.

TABLE 2

Exemplary Pump Pressure Correlation Table

| Pressure at Standard Speed | Vehicle Weight (lbs) | Max Potential Speed |
|---|---|---|
| 25% | 2,500 | 400% |
| 50% | 5,000 | 200% |
| 75% | 7,500 | 133% |
| 100% | 10,000 | 100% |

Figure 8B:
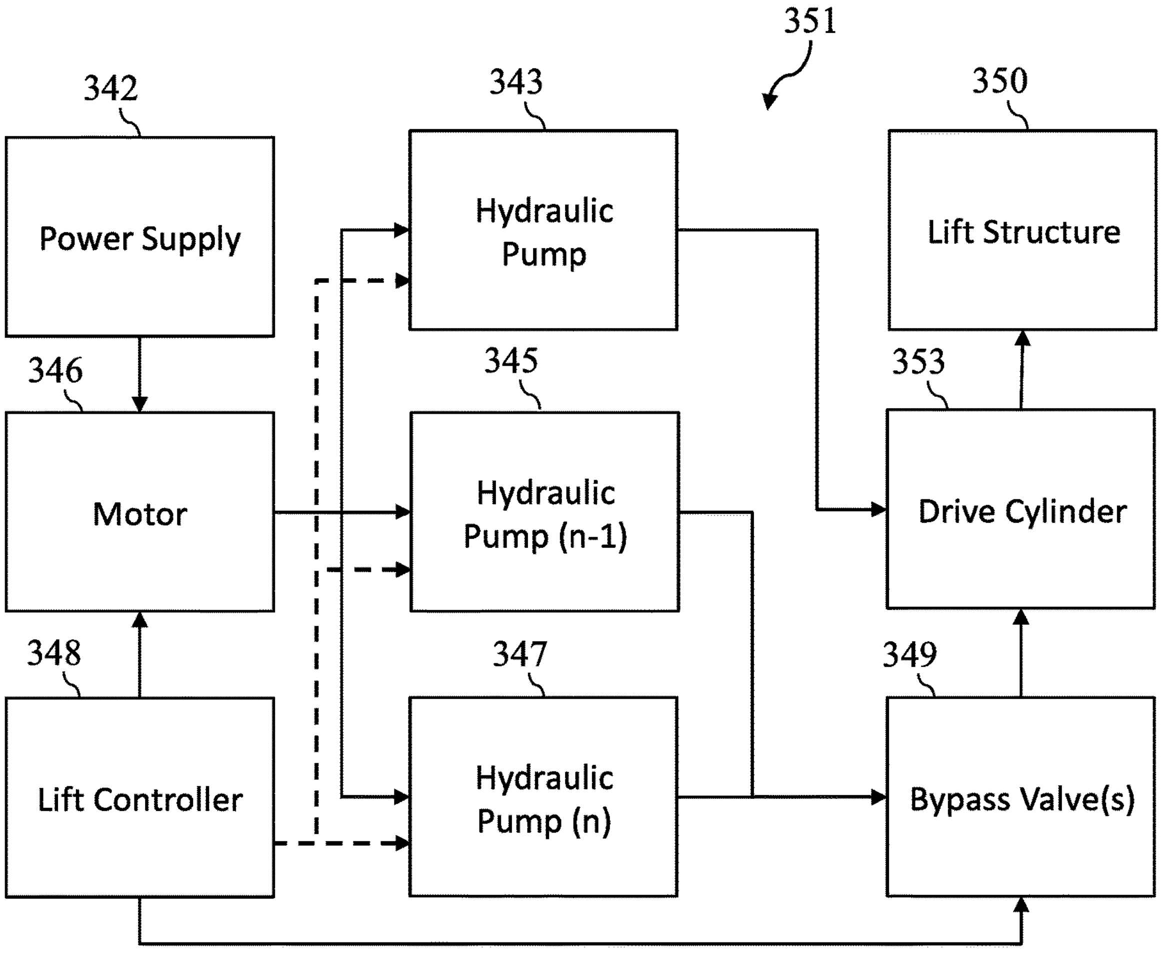
FIG. 8B is a schematic diagram of an alternative exemplary arrangement of control components, including a set of hydraulic pumps, usable to vary lift speed.

As another example of a variation on the control components, FIG. 8B shows a schematic diagram of an alternative exemplary arrangement of control components (351). The control components (351) of FIG. 8B share several features with the control components (341) of FIG. 8A, including the motor (346), the lift structure (350), the power supply (342), the lift controller (348), and the hydraulic pump (343). The control components (351) may also include one or more additional hydraulic pumps, or hydraulic pump sections, such as the hydraulic pump (n-1) (345) and the hydraulic pump (n) (347). The hydraulic pump (343) is coupled directly to a drive cylinder (353) that raises and lowers the lift structure (350). The remaining pumps (345, 347) are coupled to the drive cylinder (353) through a set of bypass valves (349) that are configured to be selectively opened and closed based upon control signals from the lift controller (348).

During operation of the control components (351), the motor (346) operates each of the hydraulic pumps (343, 345, 347) to raise the lift structure (350). During such operation, the hydraulic pump (343) will apply a first level of hydraulic flow to the drive cylinder (343) that may correspond to a default lift speed (e.g., the standard speed (206)). Each other hydraulic pump (345, 347) is capable of applying additional flow to the drive cylinder (353) depending upon the configuration of the bypass valves (349).

For example, the lift controller (348) may open each of the bypass valves (349) so that the additive flow from the hydraulic pumps (345, 347) is released (e.g., by routing the pressurized fluid back to a reservoir tank) rather than applying to the drive cylinder (353). This does not apply any additional flow to the drive cylinder (353), but it does maintain or reduce the load placed on the motor (346). Similarly, the lift controller (348) may adjust the bypass valves (349) such that one or both of the hydraulic pumps (345, 347) apply flow to the drive cylinder (353), increasing the load placed on the motor (346) but also increasing the speed at which the lift structure (350) is raised.

In the above configuration, it can be seen that the lift controller (348) is able to drive the drive cylinder (353) with a varying level of hydraulic flow and, depending upon a lifted load, corresponding speed. Varying lift characteristics may be achieved by varying the control signals provided to the motor (346), the bypass valves (349), or both in order to support a wide range of performance. As an example, this may include operating the lift with each of the bypass valves (349) open (e.g., with only the hydraulic pump (343) lifting) to raise (206) the lift at a standard speed and measuring load on the motor (346) to determine (208) the potential speed, as has been described. The lift controller (348) may then cause the lift to raise (210) at the variable speed by adjusting the operation of the motor (346), closing one or more of the bypass valves (349), or both. These adjustments may be made incrementally as part of a feedback loop until the potential speed (208) (e.g., or a maximum safe speed based on the measured load) is reached. Additionally, the performance characteristics of each of the pumps (343, 345, 347) or pump sections may be varied to provide further variability (e.g., one pump or pump section may be capable of providing a force x while a second pump or pump section may be capable of providing a force 1/x, such that one pump is appropriate for greatly increasing lift speed and motor load, while the second pump is appropriate for fine control of the lift speed and motor load).

Figure 13:
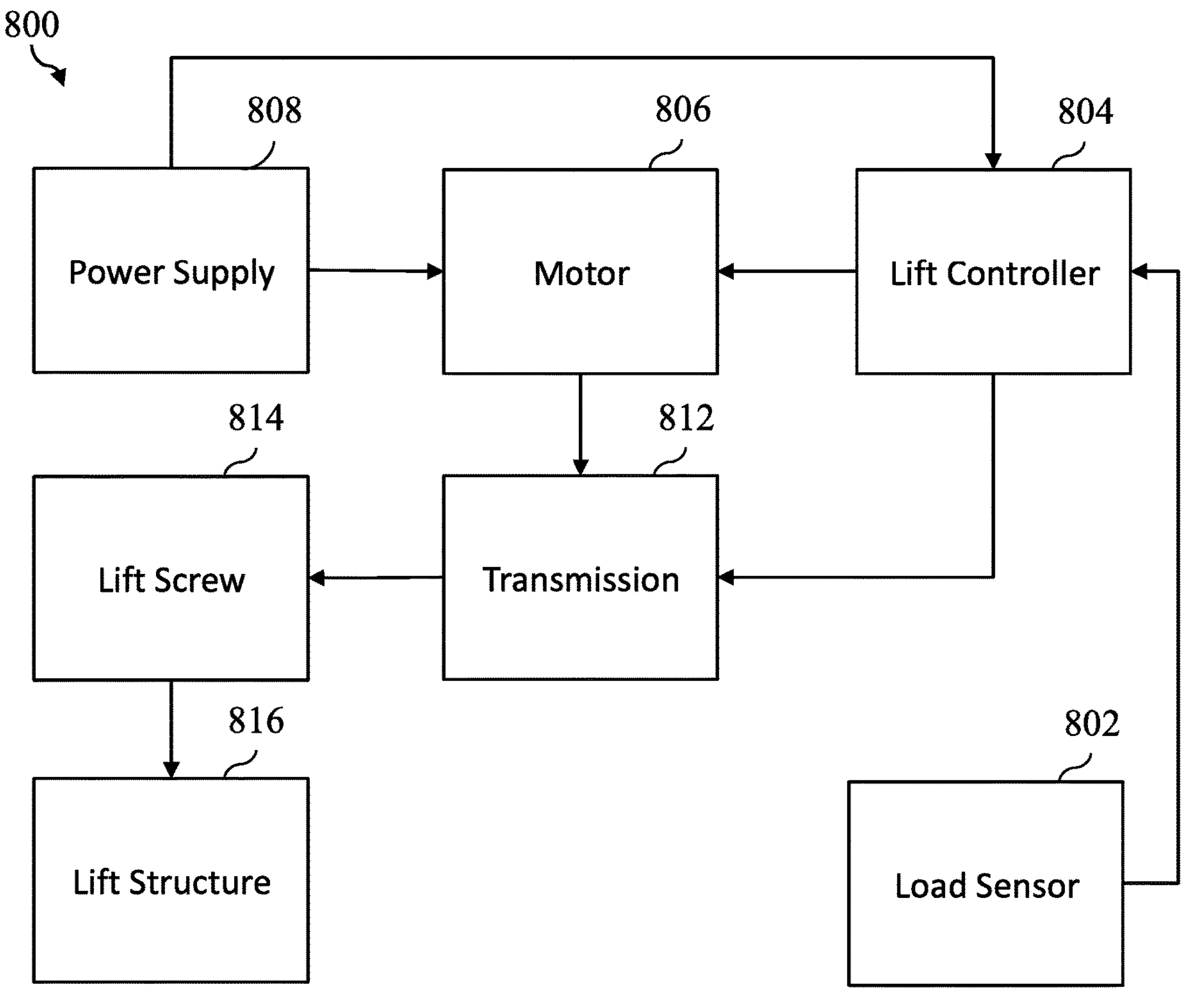
FIG. 13 is a schematic diagram of an alternative exemplary arrangement of control components including a transmission and lift screw.

As another example of a variation on the control components, FIG. 13 shows a schematic diagram of an alternative exemplary arrangement of control components (800). The control components (800) include several features similar to those already described, such as a lift controller (804), a motor (806), a power supply (808), and a lift structure (816). A load sensor (802) may be implemented in varying ways, and may include any of the components or systems disclosed herein that are capable of measuring performance or generating data that is usable to determine (208) the potential speed at which the lift may operate, and may include, for example, one or more of the variable frequency drive (304), motor sensor (309), current sensor (313), weight sensor (323), or other sensors or tools. Regardless of form, the load sensor (802) may be configured to produce and communicate data, as one or more signals, indicating the current electrical load (e.g., power draw) on the motor (806) or another performance metric of the lift (e.g., electrical draw from the power supply (808)), and communicate with the lift controller (804) in order to determine (208) potential speeds.

The control components (800) also include a transmission (812) coupled to a lift screw (814), which itself is coupled to the lift structure (816) and operable to raise and lower the lift structure (816) (e.g., such as a ball-screw lift). The transmission (812) is capable of transferring power from the motor (806) to the lift screw (814) and may include a set of gears or a continuously variable gear that allow for transfer of power from the motor (806) at varying gear ratios, in varying rotational directions (e.g., a raise direction and a lower direction), or both. The lift controller (804) may be configured to operate the motor (806) and the transmission (812) in order to vary the motor operational characteristics, the gear ratio, or both in order to achieve varying lift speeds depending upon feedback from the load sensor (802). The control components (800) may also include a variable frequency drive (e.g., such as the variable frequency drive (304)), or the lift controller (804) may be configured to support PWM control of the motor (806), or both in order to provide further variable control of the lift screw (814) rotation speed. In this manner, the lift controller (804) may determine (208) potential lift speeds based upon feedback from the load sensor (802), and then vary the operation of the motor (806), change the gear ratio of the transmission (812), or both in order to cause the lift screw (814) to rotate at the corresponding speed to cause the lift to raise (210) at the variable speed.

Figure 9:
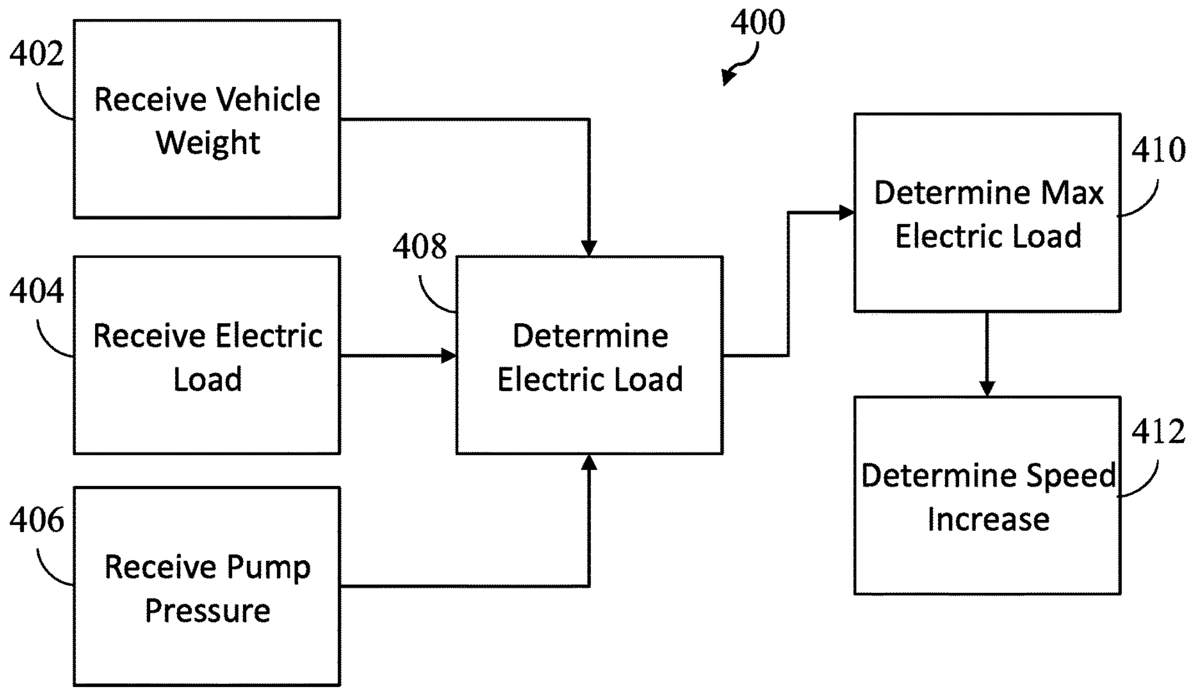
FIG. 9 is a flowchart of an exemplary set of steps that may be performed in order to determine a variable lift speed.

As can be seen from the above examples, information provided from different components may be used by itself or in combination with other information to determine (208) the potential raise speed. As an example, abstracted from a particular implementation of control components, FIG. 9 shows a flowchart of an exemplary set of steps (400) that may be performed in order to determine (208) a potential raise speed. Such steps may be performed by one or more of the lift controller (108), the variable frequency drive (110), the motor (112), or other devices having the capability to receive and process information. Initially, the device may receive information from one or more sources, which may include receiving (402) information indicating a supported vehicle's weight (e.g., information produced by the weight sensor (323)), receiving (404) information indicating the magnitude of an electrical load drawn while lifting a vehicle (e.g., information produced by the variable frequency drive (304), the current sensor (313), or the variable frequency drive (334)), or receiving information indicating a hydraulic pressure produced while lifting a vehicle (e.g., information produced by the hydraulic pump (343) or a sensor connected to the hydraulic system). Received (402, 404, 406) information may be in the form of electrical signals of varying characteristics indicating raw measurements of a sensor, may be in the form of integers or binary-encoded data, or may take other appropriate forms. Weight information may be received from sensors located on the lift, a remote sensor such as tire weight scales, a database of vehicle information, or other sources will occur to those skilled in the art in view of this disclosure.

With one or more types of information available, the system may then determine (408) an electrical load on the motor (112) during operation with the current vehicle. It will be apparent that determining (408) the electric load is one of several different ways to normalize these different data sets, and that other approaches may be suitable (e.g., normalizing a received (404) electric load to vehicle weight, rather than normalizing a received (402) vehicle weight to electric load). Regardless of the specific transformations of data, one goal is to provide a reference point between the received (402, 404, 406) data and the maximum potential electrical load at which the motor (112) is operable.

In the shown steps (400), this may include receiving (402) a vehicle weight and then determining (408) an electrical load associated with lifting that vehicle by use of a query or comparison with a database or dataset such as that shown in Table 1. This may also include receiving (404) a signal indicating an electrical load and determining (408) the electric load based thereon, which may require little or no conversion or manipulation (e.g., electric load may be rounded upward or downward, converted from a raw signal to an integer, or otherwise conditioned to be usable). Steps (400) may also include receiving (406) a pump pressure and determining (408) an electrical load associated with lifting a vehicle at that pressure by use of a query or comparison with a database or dataset such as that shown in Table 2. This may also include two or more sets of received (402, 404, 406) data being used in combination to determine (408) the electric load, such as where a vehicle weight and an electrical draw may be used in combination to determine (408) the electric load, which may provide some advantages as will be described below. Other variations exist, for example, determining (408) electrical load may also be performed using various conversion equations (e.g., a function mapping weight or pressure to a corresponding electrical load).

Having determined (408) the electric load or otherwise having normalized the received data, the device may then determine (410) a max electric load that the motor (112) or other control components are capable of supporting. This value may be configured and stored on the motor (112), the lift controller (108), or another device, or may be determined based upon the attached power supply or may be determined through incremental speed increases using a feedback loop until a static safety feature of the motor (112) or another device prevents further increases. Once the maximum performance is determined (410), the device may then determine (412) a raise speed increase that the motor (112) is capable of. As has been described, this determination (412) may be made one or more times and used to immediately or incrementally raise (210) the vehicle at a new variable speed. Determination (412) of the speed increase may be performed by, for example, comparing the current electric load to a maximum electric load, by querying or comparing to a dataset or correlation table such as that shown in Table 1 or Table 2, by using a conversion equation (e.g., a function that converts an electric load at the standard speed to a target maximum speed or a potential speed increase), or other methods.

Figure 10:
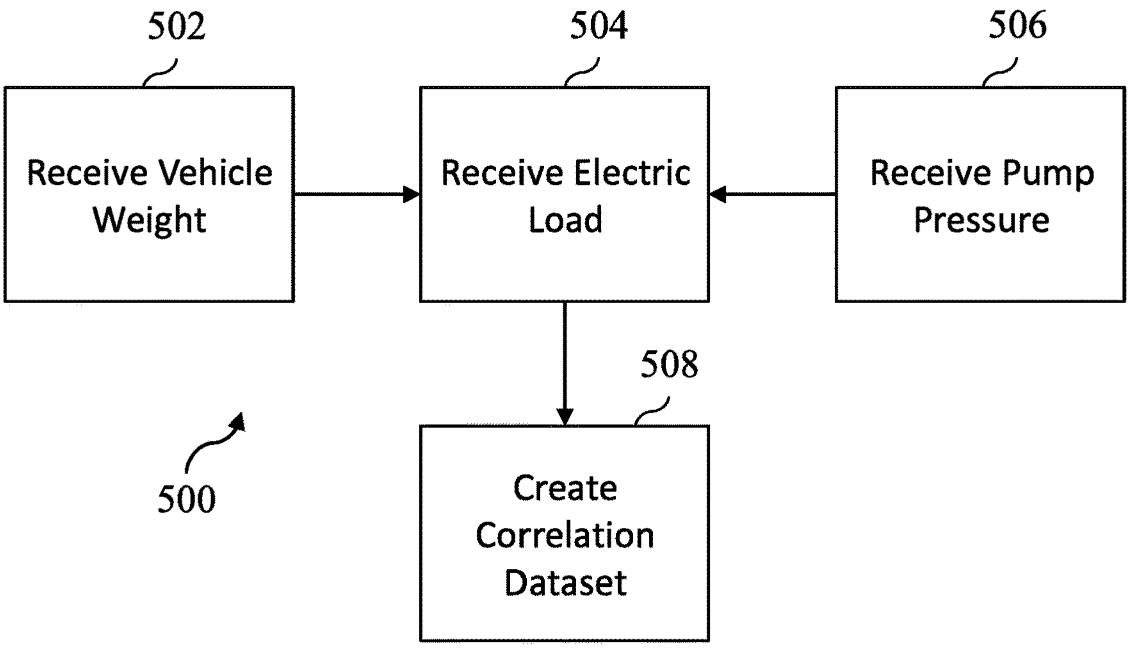
FIG. 10 is a flowchart of an exemplary set of steps that may be performed in order to build a variable lift speed dataset.

Some advantages of providing a set of control components receiving multiple sources of information (e.g., either from permanently installed or integrated components and sensors, or from temporarily installed or integrated components and sensors such as where the current sensor (313) is temporarily added to the control components (321)) that can be used to determine (412) the speed increase are redundancy of components, malfunction detection, and data correlation. As an example, FIG. 10 shows a flowchart of an exemplary set of steps (500) that may be performed to build a variable lift speed dataset such as that shown in Table 1 or Table 2, or a similar dataset. Where a device of the control components receives (504) an electrical load, and then receives (502) vehicle weight or receives (506) pump pressure, or both, the device may store and correlate such data in order to create (508) a correlation dataset.

For example, where the weight sensor (323) produces data indicating a 3000-pound vehicle is being lifted during a time segment, and the current sensor (313) indicates a draw of 10 amps during the same time segment, such information can be used to associate the 10-amp draw with a 3000-pound vehicle. Multiple such data points may be collected or extrapolated from each other (e.g., it may be estimated that a vehicle weighing 2000 pounds may draw about 6.6 amps at a standard raise speed) and then used to determine (412) a potential speed increase. In implementations where the current sensor (313) is added to the control components temporarily, it may then be removed after a usable correlation table is built. While FIG. 10 shows an exemplary set of steps that may be performed to automatically build a correlation table or similar dataset, it should be understood that such a dataset may also be built and configured manually based upon testing, simulations, or other considerations.

Figure 11:
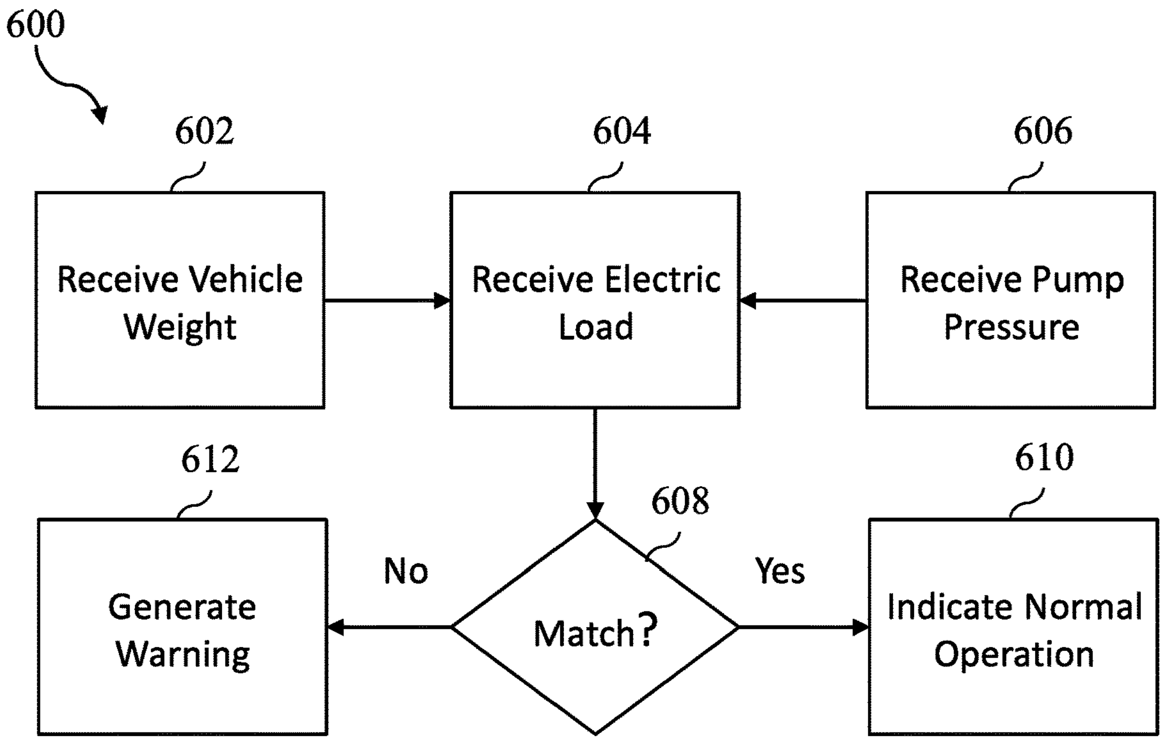
FIG. 11 is a flowchart of an exemplary set of steps that may be performed in order to identify malfunctions of the lift of FIG. 1.

As an example of malfunction detection, FIG. 11 shows a flowchart of an exemplary set of steps (600) that may be performed in order to identify the presence of a malfunctioning component. Where a device of the control components receives (604) an electrical load, and then receives (602) vehicle weight or receives (606) pump pressure, or both, the device may compare such data to historic datasets (e.g., a correlation table or conversion function) or global datasets (e.g., a global correlation table that may be associated with the performance of multiple similar lifts in new condition) and determine (608) whether the performance of one or more of the components matches (608) historic performance.

Where the current performance of the components does match (608) past performance, the device may provide an indication (610) of normal operation, which may include, for example, a positive status indicator or lack of alarm, an update to stored records or information (e.g., updating the correlation table or historic performance data to reflect normal performance on that day and time), or other similar indications. As an example, if a particular vehicle lift was used when brand new and produced data indicating an electrical draw of 10 amps (e.g., produced by the current sensor (313)) while lifting a vehicle whose weight was determined (e.g., based upon information produced by the weight sensor (323)) to be 3000 pounds, later uses of that vehicle that produce similar results may indicate that the operation of the control components has not substantially changed since installation.

Where the current performance of the components does not match (608) past performance data or global performance data, the device may generate (612) a warning indicating a change in performance relative to past performance data or global performance data. The performance information may not match (608) due to various reasons, including failure or miscalibration of a sensor (e.g., where the current sensor (313) may start to report inaccurate electrical loads, or the weight sensor (323) begins to report inaccurate vehicle weights), degrading performance of the motor (112) or variable frequency drive (110) (e.g., where the motor (112) begins to require greater electrical loads, relative to new condition, due to age, use, lack of maintenance, temperature, or other factors), degrading performance of the hydraulic pump (343) (e.g., where the hydraulic pump (343) is unable to maintain or build pressures as in new condition), and other reasons. Continuing the above example, if historic data or global specifications indicate that a brand new lift will draw 10 amps while raising a 3000-pound vehicle at a standard speed, and presently received information indicates that the lift is drawing 12 amps while raising a 3000-pound vehicle at the standard speed, it may indicate that the motor (112) needs to be serviced, or that the current sensor (313) is failing.

The generated (612) warning may include, for example, a visual or audible warning, a text warning, an electronic communication transmitted to another device over a network, and other variations as will be apparent to one of ordinary skill in the art in light of the disclosure herein. A generated (612) warning may be useful in indicating a change in one or more components of the system that have impacted the performance of the system. The particular source of the malfunction or performance change may not be immediately known, but such a warning may still be advantageous in indicating a need for inspection or maintenance of the system. As another example, for a set of control components including the variable frequency drive (110), the current sensor (313), and the weight sensor (323), a change in performance may be more immediately pinpointed due to the redundancy of electrical load reporting.

Other features and variations of the steps of FIG. 11 exist. As an example, while tracking use and performance of lift components as part of comparing (608) to historical data, a lift controller or other computing device may additionally track and store a lift usage dataset that may include, for example, lift cycles, lift operation time, lift load over time, and other usage characteristics, and may be further configured to provide various maintenance notices based thereon. This may include tracking and correlate motor operation to a real-time clock in order to produce a timeline of use. As an example, the system may be configured to determine estimated wear and/or remaining life of high-wear items such as equalizer cables and may generate warnings (612) to provide or enforce a maintenance schedule for such items based upon usage rather than detected (608) changes in performance. Other preventative maintenance and inspection tasks may also be communicated via generated (612) warnings and may include, for example, maintenance, replacement, or inspection tasks related to vehicle adapters, grease points, torque anchor bolts, and hydraulic fluid.

Determining and generating (612) warnings relating to maintenance, inspection, and replacement may be particularly advantageous when implemented with control components such as those shown in FIG. 5A, which may use the current sensor (313) to determine the load on the motor (316) and, correspondingly, the weight of a vehicle being lifted. While such a system may be configured to generate (612) warnings based on direct tracking of usage (e.g., number of raise and lower cycles, total operation time), it may also be configured to generate (612) warnings based on determined or composite usage indicators. As an example, this may include accelerating a maintenance schedule for one or more components of a lift by a configured amount for each lift cycle for a vehicle exceeding a configured weight (e.g., a lift cycle for a vehicle exceeding 10,000 pounds may be factored against the usage history as 1.8 lift cycles, while normal lift cycles may be valued at 1.0 lift cycles). As another example, this may include separately tracking such usage such that particular maintenance tasks are indicated for every 15 lift cycles meeting such criteria (e.g., inspect hydraulic seals after every 15 lift cycles that include a 10,000-pound or greater vehicle), or for every 250,000 pounds lifted during such lift cycles (e.g., inspect hydraulic seals after every set of lift cycles for vehicles 10,000 pounds or greater once the aggregate set weight reaches 250,000 pounds).

As an addition or alternative to tracking and influencing usage based upon a determined weight of a lifted vehicle, usage may be tracked, and warnings generated (612) based on load measured by the current sensor (313). As an example, where a detected electrical load on the motor (316) exceeds a configured threshold (e.g., a threshold indicating normal use, such as the standard load on the motor (316) while lifting a 5,000-pound vehicle at the standard speed (206), whereas use exceeding such thresholds may indicate use of optimized or dynamic lift speed features, or extremely heavy vehicle lifts), related usage may be tracked at an increased ratio in order to accelerate a maintenance schedule (e.g., operation time below the threshold may be recorded as 1.0 second per second, while operation above the threshold may be recorded as 1.8 second per second) or may be separately tracked and associated with particular maintenance tasks as has been described (e.g., for every 50 lift cycles where the load threshold is exceeded, inspect equalizer cables).

As another example, a lift controller or other computing device may track motor performance (e.g., speed, cycle time) and create a historic dataset that describes the minimum and maximum heights to which the lift structure has been raised or lowered. Such information may advantageously be used to suggest characteristics of the location at which the lift is installed (e.g., ceiling height), or may be used to determine that a different lift may be more appropriate for that location and application.

As another example, the lift controller or another computing device may be configured to receive temperature data from a temperature sensor that is positioned on or near the lift controller itself, a motor, a variable frequency drive, or other components of the lift system. Temperature information may be saved and correlated with motor usage and other detectable lift conditions to produce a timeline of thermal effects based on lift operation. Such a dataset may be advantageously used to identify the causes of thermal effects and/or correlated to performance of the motor or other components of the system.

As another example, the lift controller or another computing device may be configured to integrate with a shop management system for a facility at which the lift is in use. This may allow individual vehicle lifts to report to a central system when they are in use or available based upon operation of the motor or information from weight sensors on the lift structure, or may allow the lift controller to generate (612) a warning if the weight of a currently lifted vehicle does not match an anticipated weight for a vehicle assigned to that lift.

Figure 14:
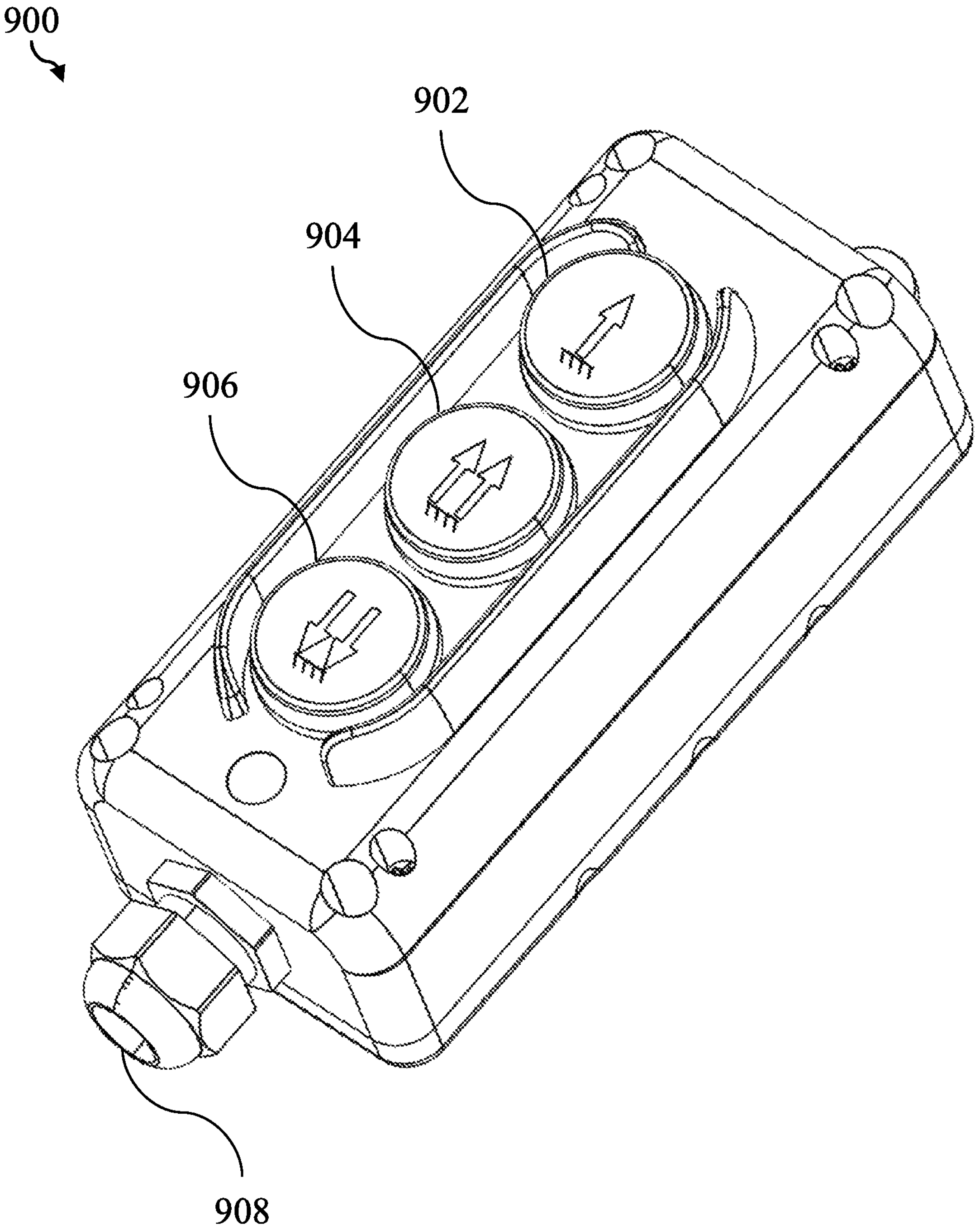
FIG. 14 is a perspective view of an exemplary pendant control usable with several of the disclosed lift systems.

FIG. 14 shows a perspective view of an exemplary pendant control (900) that may be configured for any the disclosed control components usable with the steps of FIG. 3. The pendant control (900) may be in communication with a lift controller (e.g., the lift controller (308)) and provides a human-machine interface that allows a user to provide control signals that influence the operation of the lift controller. The pendant control (900) includes a first button (902) that, when pressed, communicates with the lift controller to raise the lift structure at a first speed. The first speed may be, for example, the standard speed (206) or a predetermined fraction of the standard speed (e.g., 50% of standard speed, 25% of standard speed, and so on). The first button (902) may provide a substantially static raise speed when pressed and may be advantageous for fine adjustments of the lift structure such as may be required when a user is visually spotting to ensure engagement (204) of the lift with a vehicle.

A second button (904) may be configured to, when pressed, raise the lift structure at a dynamic variable speed that is determined using steps such as those shown in FIG. 3. This may allow a user to raise the lift structure at an optimized speed that is determined and achieved using an incremental or continuous feedback loop, as has been described herein. As an example, an intermittent feedback loop may be configured to determine (208) and adjust (210) to a subsequent variable speed once per second, while a continuous feedback loop may be configured to determine (208) and adjust (210) to a subsequent variable speed as quickly as the processing components, sensors, and signal connections allow. Either method of optimizing raise speed may be alternately or additionally limited by a maximum acceleration step per cycle or per second, such that the increase from the standard (206) raise speed to the variable (210) raise speed may occur over a period of time that allows for steady acceleration that will not startle users or unsettle a raised vehicle or other load.

A third button (906) may be configured to, when pressed, lower the lift structure at a static speed, or a variable speed that may be influenced by gravity or the particular mechanism of the vehicle lift. As an example, the third button (906) may cause a pressurized hydraulic member to release fluid under the force of gravity or cause a lift screw to rotate in a lowering direction under the force of gravity.

The pendant control (900) also includes a port (908) that allows for a wired physical connection to a lift controller, variable frequency drive, motor or other component. In some implementations, the pendant control (900) may instead connect wirelessly (e.g., via WI-FI, BLUETOOTH, or other wireless communication). In some implementations, the pendant control (900) may include a dial or joystick that is usable to operate the lift at a standard speed or a ratio of the standard speed, or at a dynamic optimized speed, instead of or in addition to the buttons (902, 904, 906). In some implementations, the pendant control (900) may include a light emitting diode or other display that may be a touch screen and may provide a software user interface that allows for the lift to be raised at static or dynamic speeds by interacting with virtual buttons. In some implementations, the software user interface may be configured on or accessed via a device other than the pendant control (900), such as a smartphone, tablet, or proprietary computing device. In some implementations, a lift system may include multiple pendant controls (900) or other controls disposed about the lift area, such that a user may be able to control the lift from either side of a vehicle.

Other features and variations of the disclosed systems and control component exist. For example, in some implementations a variable frequency drive may be configured to operate a motor in forward or reverse, which may allow for speed optimization of vehicle lowering as opposed to relying upon gravity or mechanical limitations of the structure. Such implementations may be implemented as bi-directional hydraulic pump systems that are capable of operating the hydraulic pump in reverse in order to lower the lift structure at a desired speed instead of relying upon gravity and/or fluid dynamics to control the lowering speed.

In such implementations, the variable frequency drive may be configured to operate the motor in reverse at the desired output in order to provide a controlled lowering speed and prevent sudden or uncontrolled lowering. In this manner, the variable frequency drive may meter the rate of fluid returning to the reservoir and determine the current lowering speed based thereon, and may prevent the lowering speed from exceeding a configured speed (e.g., which may be determined arbitrarily or may be determined based upon law or regulation). A determination of lowering speed based upon fluid metering may also be used to determine and provide an optimized lowering speed (e.g., based upon the release of fluid from the system, the weight of the load, etc.) that may be gradually reached and maintained using steps similar to those of FIG. 3, while also being limited within a configured speed limit. A system such as that described above advantageously allows for controlled and optimized raising and lowering speeds.

In some implementations, the lowering speed of the system may be controlled and optimized with the use of regenerative components that are capable of converting force or heat into electrical charge for storage in an attached battery. The attached battery may be configured to expend charge while raising a vehicle (e.g., by providing charge to a motor), and then be at least partially recharged while lowering the vehicle. The charge rate for a battery when lowering a vehicle may also be measured and used with information such as the vehicle's weight to determine a current lowering speed of the vehicle, which may be used when controlling or optimizing lowering speed, as has been described.

The following examples relate to various non-exhaustive ways in which the teachings herein may be combined or applied. It should be understood that the following examples are not intended to restrict the coverage of any claims that may be presented at any time in this application or in subsequent filings related to this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

EXAMPLE 1

A system of lift control components comprising: a motor operable to raise a lift structure, and a controller configured to condition electrical power from a power supply and provide the conditioned electrical power to the motor, wherein the controller is configured to: operate the motor to raise the lift structure at a first raising speed; determine a load on the motor; determine a second raising speed based on the load on the motor, where the second raising speed is faster than the first raising speed; and operate the motor to raise the lift structure at the second raising speed.

EXAMPLE 2

The system of lift control components of Example [0123], the controller comprising: a lift controller; and a variable frequency drive configured to: operate the motor, determine the load on the motor as a function of a magnitude of electrical power drawn from the power supply, and transmit a first signal to the lift controller, where the first signal characterizes the load; wherein the lift controller is configured to provide control signals to the variable frequency drive as a function of the first signal; and wherein the variable frequency drive and the lift controller are configured to operate in a feedback loop during operation of the motor.

EXAMPLE 3

The system of lift control components of any one or more of Examples 1 through 2, the controller comprising: a variable frequency drive configured to operate the motor using electrical power drawn from a power supply; a current sensor configured to determine the load on the motor as a function of a magnitude of the electrical power drawn from the power supply; a lift controller configured to provide control signals to the variable frequency drive as a function of the load from the current sensor; and wherein the variable frequency drive and the lift controller are configured to operate in a feedback loop during operation of the motor.

EXAMPLE 4

The system of lift control components of Example 3, wherein the current sensor is: coupled to an electrical connection between the power supply and the variable frequency drive, and configured to determine the load from an amount of electrical power transmitted via the direct connection.

EXAMPLE 5

The system of lift control components of any one or more of Examples 1 through 4, the controller comprising: a lift controller; and a variable frequency drive configured to: operate the motor, and transmit the load on the motor to the lift controller, where the load is a function of a magnitude of electrical power drawn from the power supply; wherein the lift controller is configured to provide control signals to the variable frequency drive as a function of the load from the variable frequency drive; wherein the variable frequency drive and the lift controller are configured to operate in a feedback loop during operation of the motor; and wherein the system of lift control components is configured as an integrated power unit (IPU) that contains a set of IPU components including the lift controller, the variable frequency drive, and the motor, wherein the set of IPU components is an arranged within the IPU to minimize a distance traveled by a signal in the feedback loop.

EXAMPLE 6

The system of lift control components of Example 5, wherein the lift structure comprises a motor mount, and wherein a case enclosing the set of IPU components is adapted to be coupled to the motor mount and replace a second motor that is not capable of determining and raising the lift structure at the second raising speed.

EXAMPLE 7

The system of lift control components of any one or more of Examples 1 through 6, the controller comprising: a variable frequency drive configured to operate the motor; a weight sensor coupled to the lift structure and configured to determine the load on the motor as a function of a weight supported by the lift structure; and a lift controller configured to provide control signals to the variable frequency drive as a function of the load determined by the weight sensor; wherein the variable frequency drive and the lift controller are configured to operate in a feedback loop during operation of the motor.

EXAMPLE 8

The system of lift control components of Example 7, wherein the lift controller is further configured to: store a correlation table that associates vehicle weights with loads at corresponding standard raise speeds and corresponding maximum potential raise speeds; and using the correlation table, determine a maximum potential raise speed as a function of the weight supported by the lift structure and a load at standard raise speed.

EXAMPLE 9

The system of lift control components of any one or more of Examples 1 through 8, the controller comprising: a hydraulic pump operable by the motor to raise and lower the lift structure, wherein the hydraulic pump is configured to generate data indicating a current pressure during operation; and a lift controller configured to: determine the load on the motor as a function of the current pressure produced by the hydraulic pump while the lifting structure is being raised, and provide control signals the motor as a function of the load from the hydraulic pump; wherein the lift controller and the hydraulic pump are configured to operate in a feedback loop during of the system of lift control components.

EXAMPLE 10

The system of lift control components of Example 9, wherein the lift controller is further configured to: store a correlation table that associates vehicle weights with pressures at standard raise speeds and maximum potential raise speeds; and using the correlation table, determine a maximum potential raise speed as a function of a vehicle weight associated with the current pressure.

EXAMPLE 11

The system of lift control components of any one or more of Examples 1 through 10, wherein: the load on the motor comprises indications of load from at least two of: a variable frequency drive configured to operate the motor from electrical power drawn from a power supply and determine the load on the motor as a function of a magnitude of electrical power drawn from the power supply, a current sensor coupled to a connection that directly connects the power supply and the variable frequency drive, and configured to determine the load on the motor as a function of a magnitude of electrical power drawn from the power supply, a weight sensor coupled to the lift structure and configured to determine the load on the motor as a function of a weight supported by the lift structure, and a hydraulic pump operable to raise and lower the lift structure, and configured to generate data indicating a current pressure during operation; and the controller is configured to correlate a load from a first source with a load from a second source.

EXAMPLE 12

The system of lift control components of Example 11, wherein: the load on the motor is a function of indications of load from at least two different measuring sources, and the controller is configured to: compare a recent load from the at least two different measuring sources to a historic load from the at least two different measuring sources, and where the recent load does not substantially match the historic load, provide an indication that a component of the system of lift control components requires maintenance.

EXAMPLE 13

The system of lift control components of any one or more of Examples 11 through 12, wherein the controller is configured to: store first performance data that describes a first load on the motor while raising a first vehicle with the lift structure; store second performance data that describes a second load on the motor while raising one of the first vehicle and a second vehicle with the lift structure; determine whether the system of lift control components requires maintenance as a function of the first performance data and the second performance data; and provide a human-perceivable indication of whether the system of lift control components requires maintenance.

EXAMPLE 14

A method comprising: engaging a lift structure with a vehicle; with a controller of a set of lift control components, operating a motor to raise the lift structure at a first speed; while operating the motor at the first speed, determining a load on the motor; determining a potential raising speed based on the load on the motor; and operating the motor to raise the lift structure at the potential raising speed.

EXAMPLE 15

The method of Example 14, wherein the controller comprises: a lift controller; and a variable frequency drive configured to: operate the motor using electrical power drawn from a power supply, determine the load on the motor as a function of a magnitude of the electrical power drawn from the power supply, and transmit the determined load to the lift controller; wherein the lift controller is configured to provide control signals to the variable frequency drive as a function of the load transmitted by the variable frequency drive; and wherein the variable frequency drive and the lift controller are configured to operate in a feedback loop during operation of the motor.

EXAMPLE 16

The method of any one or more of Examples 14 through 15, wherein the controller comprises: a variable frequency drive configured to operate the motor with electrical power drawn from a power supply; a current sensor configured to determine the load on the motor as a function of a magnitude of the electrical power drawn from the power supply; and a lift controller configured to provide control signals to the variable frequency drive as a function of the load determined by the current sensor; wherein the variable frequency drive and the lift controller are configured to operate in a feedback loop during operation of the motor.

EXAMPLE 17

The method of any one or more of Examples 14 through 16, wherein the controller comprises: a lift controller; a variable frequency drive configured to: operate the motor using electrical power drawn from a power supply, determine the load on the motor as a function of a magnitude of the electrical power drawn from the power supply, and transmit the load to the lift controller; and an integrated power unit (IPU) that contains a set of IPU components including the lift controller, the variable frequency drive, and the motor; wherein the lift controller is configured to provide control signals to the variable frequency drive as a function of the load from the variable frequency drive; wherein the variable frequency drive and the lift controller are configured to operate in a feedback loop during operation of the motor; and wherein the set of IPU components is arranged within the IPU to minimize a distance traveled by a signal in the feedback loop.

EXAMPLE 18

The method of any one or more of Examples 14 through 17, wherein the controller comprises: a variable frequency drive configured to operate the motor; a weight sensor coupled to the lift structure and configured to determine the load on the motor as a function of a weight supported by the lift structure; and a lift controller configured to provide control signals to the variable frequency drive as a function of the load determined by the weight sensor; wherein the variable frequency drive and the lift controller are configured to operate in a feedback loop during operation of the motor.

EXAMPLE 19

The system of lift control components of any one or more of Examples 1 through 13, the controller comprising: a hydraulic pump operable by the motor to raise and lower the lift structure, wherein the hydraulic pump is configured to generate data indicating a pressure produced by the hydraulic pump during operation; and a lift controller configured to: determine the load on the motor as a function of the data, and provide control signals the motor as a function of the load from the hydraulic pump; wherein the lift controller and the hydraulic pump are configured to operate in a feedback loop during operation of the motor.

EXAMPLE 20

A vehicle lift comprising: a lift structure configured to engage a vehicle; a motor operable to raise the lift structure; a variable frequency drive configured to: operate the motor using electrical power drawn from a power supply, determine a first load on the motor as a function of a magnitude of the electrical power drawn from the power supply, and transmit the first load to a lift controller; a current sensor configured to determine a second load indicator describing the load on the motor as a function of the magnitude of electrical power drawn from the power supply; and a lift controller configured to: provide control signals to the variable frequency drive as a function of the first load indicator and the second load indicator; compare the first load indicator and the second load indicator to one or more historic load indicators from at least one of the current sensor and the variable frequency drive; and where the first load indicator and the second load indicator do not substantially match the one or more historic load indicators, provide an indication that the vehicle lift requires maintenance; wherein the variable frequency drive and the lift controller are configured to operate in a feedback loop during operation of the motor.

EXAMPLE 21

A vehicle lift comprising: a lift structure configured to engage a vehicle; a motor operable to raise the lift structure; a sensor configured to produce a signal as a function of a power draw of the motor; a speed controller configured to: store an optimal power draw target; operate the motor in order to raise the lift structure; receive the signal from the sensor during operation of the motor; determine a power draw as a function of the signal; and increase a rate of operation of the motor until the power draw matches the optimal power draw target.

EXAMPLE 22

A vehicle lift comprising: a lift structure configured to engage a vehicle; a motor operable to raise the lift structure; a sensor configured to produce a signal as a function of the power draw of the motor; a controller configured to: store a lift usage dataset; receive the signal from the sensor during operation of the motor; determine a vehicle weight as a function of the signal; update the lift usage dataset as a function of the vehicle weight; and generate a warning as a function of the lift usage dataset, wherein the warning indicates a need for a maintenance task.

It should be understood that any one or more of the teachings, expressions, embodiments, examples, etc. described herein may be combined with any one or more of the other teachings, expressions, embodiments, examples, etc. that are described herein. The teachings, expressions, embodiments, examples, etc. herein should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A system of lift control components comprising:

a 3-phase motor operable to raise a lift structure, and a controller configured to condition single-phase electrical power from a power supply and provide conditioned 3-phase electrical power to the motor, wherein the controller is configured to:

operate the motor to raise the lift structure at a first raising speed;

determine a load while raising the lift structure at the first raising speed;

determine a second raising speed based at least partially on the load, wherein the second raising speed is faster than the first raising speed; and operate the motor to raise the lift structure at the second raising speed, wherein the controller comprises a variable frequency drive and a lift controller, wherein the variable frequency drive and the lift controller are configured to operate in a feedback loop during operation of the motor to raise the lift structure at the first raising speed.

2. The system of claim 1, wherein the controller comprises a variable frequency drive.

3. The system of claim 2, wherein the variable frequency drive is configured:

to receive single-phase electrical power from the power supply, wherein the single-phase electrical power has a current;

vary the current by conditioning the electrical power; and provide the conditioned 3-phase electrical power to the motor to operate the motor.

4. The system of claim 2, wherein the variable frequency drive is configured to determine the load, wherein the load is indicative of the amount of current or power drawn from the power supply.

5. The system of claim 2, wherein the controller comprises a current sensor configured to determine the load.

6. The system of claim 5, wherein the current sensor is interposed between the variable frequency drive and the power supply.

7. The system of claim 1, wherein the controller comprises a weight sensor configured to determine the load.

8. The system of claim 1, wherein the controller comprises a pressure sensor configured to determine the load.

9. The system of claim 1, wherein the controller is configured to operate the motor to raise the lift structure at the second raising speed using pulse width modulation.

10. The system of claim 1, wherein the controller further comprises a human machine interface operable to alternately:

after the controller determines the second raising speed, selectively operate the motor to raise the lift structure at the first raising speed; and after the controller determines the second raising speed, selectively operate the motor to raise the lift structure at the second raising speed.

11. The system of claim 10, wherein the human machine interface comprises a pendant control.

12. The system of claim 11, wherein the pendant control comprises a first button configured to operate the motor to raise the lift structure at the first raising speed.

13. The system of claim 12, wherein the pendant control comprises a second button configured to operate the motor to raise the lift structure at the second raising speed.

14. The system of claim 1, wherein load is determined using signals from least two of the following: a variable frequency drive, a current sensor, and a pressure sensor.

* * * * *